(12) United States Patent
Teruyama

(10) Patent No.: US 11,227,130 B2
(45) Date of Patent: Jan. 18, 2022

(54) INFORMATION PROCESSING DEVICE, INFORMATION PROCESSING METHOD, AND PROGRAM

(71) Applicant: SONY CORPORATION, Tokyo (JP)

(72) Inventor: Katsuyuki Teruyama, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/750,351

(22) PCT Filed: Jul. 27, 2016

(86) PCT No.: PCT/JP2016/071959
§ 371 (c)(1),
(2) Date: Feb. 5, 2018

(87) PCT Pub. No.: WO2017/038319
PCT Pub. Date: Mar. 9, 2017

(65) Prior Publication Data
US 2018/0225486 A1 Aug. 9, 2018

(30) Foreign Application Priority Data
Sep. 4, 2015 (JP) .............................. JP2015-174435

(51) Int. Cl.
G06K 7/10 (2006.01)
G06K 19/07 (2006.01)
(Continued)

(52) U.S. Cl.
CPC ......... *G06K 7/10297* (2013.01); *G06K 19/07* (2013.01); *G06K 19/0723* (2013.01);
(Continued)

(58) Field of Classification Search
CPC ........... G06K 7/10297; G06K 19/0723; H04B 5/0056; H04B 5/0031; H04B 1/59
See application file for complete search history.

(56) References Cited

U.S. PATENT DOCUMENTS

2006/0120325 A1* 6/2006 Tanabe .................. H04W 36/06
370/331
2007/0138302 A1* 6/2007 Antoniou ................ H04L 41/00
235/492
(Continued)

FOREIGN PATENT DOCUMENTS

CN 102647210 A 8/2012
CN 103516505 A 1/2014
(Continued)

OTHER PUBLICATIONS

List of P2P protocols. https://web.archive.org/web/20141217035847/https://en.wikipedia.org/wiki/List_of_P2P_protocols Dec. 17, 2014 (Year: 2014).*

(Continued)

*Primary Examiner* — Daniel I Walsh
(74) *Attorney, Agent, or Firm* — Paratus Law Group, PLLC

(57) ABSTRACT

There is provided an information processing device including: a processing unit configured to select a first processing mode in which static information is transmitted or a second processing mode in which dynamic information according to a process is transmitted on a basis of a predetermined request recognized in contactless communication with an external device and to perform a process corresponding to a selected processing mode. The processing unit selects the first processing mode in a case in which the recognized predetermined request is a read request for causing information to be transmitted and selects the second processing mode in a case in which the recognized predetermined request is a write request for causing information to be written in a recording medium.

9 Claims, 16 Drawing Sheets

(51) Int. Cl.
  *H04B 5/00* (2006.01)
  *H04W 76/14* (2018.01)
  *H04B 1/59* (2006.01)
  *H04W 36/00* (2009.01)

(52) U.S. Cl.
  CPC .............. *H04B 1/59* (2013.01); *H04B 5/0056* (2013.01); *H04W 76/14* (2018.02); *H04W 36/03* (2018.08)

(56) References Cited

U.S. PATENT DOCUMENTS

| | | | |
|---|---|---|---|
| 2007/0222610 A1* | 9/2007 | Tagato | G06K 19/07336 340/572.7 |
| 2009/0015386 A1* | 1/2009 | Kang | G06K 19/07749 340/10.51 |
| 2009/0045923 A1* | 2/2009 | van Eeden | G06K 7/0008 340/10.3 |
| 2010/0013606 A1* | 1/2010 | Gallo | G06F 12/1441 340/10.51 |
| 2010/0178868 A1* | 7/2010 | Charrat | H04M 1/72412 455/41.1 |
| 2011/0275316 A1* | 11/2011 | Suumaki | H04L 69/24 455/41.1 |
| 2012/0069772 A1* | 3/2012 | Byrne | H04W 8/24 370/255 |
| 2012/0100803 A1* | 4/2012 | Suumaki | H04W 12/03 455/41.1 |
| 2012/0135693 A1* | 5/2012 | Teruyama | H04B 5/0056 455/68 |
| 2012/0212325 A1* | 8/2012 | Kanemoto | H04Q 9/00 340/10.1 |
| 2012/0265988 A1* | 10/2012 | Ehrensvard | G06F 21/35 713/165 |
| 2013/0036231 A1* | 2/2013 | Suumaki | H04W 12/04 709/228 |
| 2013/0084800 A1* | 4/2013 | Troberg | H04B 5/0037 455/41.1 |
| 2013/0154794 A1* | 6/2013 | Menard | G07C 9/00944 340/5.61 |
| 2013/0217329 A1* | 8/2013 | Reddy Badvel | G06Q 10/00 455/41.1 |
| 2013/0258967 A1* | 10/2013 | Watfa | H04W 76/10 370/329 |
| 2013/0267167 A1* | 10/2013 | Hillan | H04W 28/22 455/41.1 |
| 2013/0344804 A1* | 12/2013 | Chen | H04B 5/02 455/41.1 |
| 2014/0003548 A1* | 1/2014 | Lefley | G06K 7/10237 375/268 |
| 2014/0019311 A1* | 1/2014 | Tanaka | G06Q 30/0643 705/27.2 |
| 2014/0035391 A1* | 2/2014 | Kitani | H02J 50/10 307/104 |
| 2014/0068719 A1* | 3/2014 | Kiukkonen | H04W 12/50 726/4 |
| 2014/0106671 A1* | 4/2014 | Hillan | H04B 5/02 455/41.1 |
| 2014/0117921 A1* | 5/2014 | Suomela | H04B 5/0031 320/103 |
| 2014/0207629 A1* | 7/2014 | Bradley | G06Q 10/087 705/28 |
| 2014/0280941 A1* | 9/2014 | Maguire | H04L 67/10 709/225 |
| 2014/0342665 A1* | 11/2014 | Amano | H04W 36/0005 455/41.1 |
| 2014/0355063 A1* | 12/2014 | Jang | G06F 3/1205 358/1.15 |
| 2014/0368675 A1* | 12/2014 | Hiroki | H04W 52/0229 348/207.2 |
| 2015/0011160 A1* | 1/2015 | Jurgovan | G06F 1/26 455/41.1 |
| 2015/0094046 A1* | 4/2015 | Jung | H04W 36/0022 455/415 |
| 2015/0096014 A1* | 4/2015 | Terashita | G06F 21/35 726/20 |
| 2015/0355874 A1* | 12/2015 | Kamoi | H04N 1/00339 358/1.15 |
| 2016/0014660 A1* | 1/2016 | Bar | H04W 12/00 455/439 |
| 2016/0295487 A1* | 10/2016 | Pandit | H04W 4/48 |
| 2016/0381606 A1* | 12/2016 | Lou | H04W 36/0066 370/331 |
| 2017/0223579 A1* | 8/2017 | Lee | H04W 36/03 |
| 2018/0020382 A1* | 1/2018 | Kim | H04L 1/1819 |
| 2018/0091002 A1* | 3/2018 | Park | H02J 50/80 |
| 2018/0225486 A1* | 8/2018 | Teruyama | H04W 76/14 |
| 2020/0195438 A1* | 6/2020 | Liu | H04L 9/0643 |
| 2020/0389876 A1* | 12/2020 | Islam | H04W 72/042 |

FOREIGN PATENT DOCUMENTS

| | | | |
|---|---|---|---|
| JP | 2005352814 | * | 12/2005 |
| JP | 2006287536 | * | 10/2006 |
| JP | 2008-160856 A | | 7/2008 |
| JP | 2013-219863 A | | 10/2013 |
| JP | 2015-011592 A | | 1/2015 |

OTHER PUBLICATIONS

Jul. 16, 2019, European Search Report issued for related EP Application No. 16841351.6.

Jun. 2, 2020, Japanese Office Action issued for related JP application No. 2017-537660.

Oct. 31, 2019, Chinese Office Action issued for related CN Application No. 201680048767.9.

Apr. 12, 2019, European Communication issued for related EP Application No. 16841351.6.

Sim et al., Concurrent Bluetooth Module Activation for Reducing the Latency of NFC Connection Handover, The 18$^{th}$ IEEE International Symposium on Consumer Electronics (ISCE 2014), Jun. 22-25, 2014, pp. 1 and 2, IEEE, Je Ju Island, South Korea.

* cited by examiner

| 7 | 6 | 5 | 4 | 3 | 2 | 1 | 0 | DESCRIPTION |
|---|---|---|---|---|---|---|---|---|
| \multicolumn{8}{|c|}{Charging Capability} | POSSIBLE CHARGING SCHEME IS EXPRESSED WITH BITS. |

B:

| 7 | 6 | 5 | 4 | 3 | 2 | 1 | 0 | DESCRIPTION |
|---|---|---|---|---|---|---|---|---|
| X | X | X | X | X | X | X |   |   |
|   |   |   |   |   |   |   | 1 | CHARGING THROUGH NFC IS POSSIBLE. |

| 7 | 6 | 5 | 4 | 3 | 2 | 1 | 0 | DESCRIPTION |
|---|---|---|---|---|---|---|---|---|
| \multicolumn{8}{|c|}{Charging Technology Capability} | POSSIBLE CHARGING SCHEME IS INDICATED. |
| \multicolumn{8}{|c|}{Communication Attributes} | POSSIBLE COMMUNICATION ATTRIBUTE IS INDICATED. |

B:

| 7 | 6 | 5 | 4 | 3 | 2 | 1 | 0 | DESCRIPTION |
|---|---|---|---|---|---|---|---|---|
| X | X | X | X | X | X | X |   |   |
|   |   |   |   |   |   |   | 1 | CHARGING THROUGH NFC IS POSSIBLE. |

C:

| 7 | 6 | 5 | 4 | 3 | 2 | 1 | 0 | DESCRIPTION |
|---|---|---|---|---|---|---|---|---|
| X | X | X | X | X | X | X |   |   |
|   |   |   |   |   |   |   | X | 0 = BI-DIRECTIONAL PROTOCOL (IT IS POSSIBLE TO EXCHANGE CONTROL DATA OF CHARGING PROTOCOL). 1 = UNI-DIRECTIONAL PROTOCOL (IT IS NOT POSSIBLE TO EXCHANGE CONTROL DATA OF CHARGING PROTOCOL). |

| 7 | 6 | 5 | 4 | 3 | 2 | 1 | 0 | DESCRIPTION |
|---|---|---|---|---|---|---|---|---|
| \multicolumn{8}{|c|}{Charging Technology} | CHARGING SCHEME TO BE USED IS INDICATED. |

| 7 | 6 | 5 | 4 | 3 | 2 | 1 | 0 | DESCRIPTION |
|---|---|---|---|---|---|---|---|---|
| Charging Technology || || || || || || || | CHARGING SCHEME TO BE USED IS INDICATED. |

B

| 7 | 6 | 5 | 4 | 3 | 2 | 1 | 0 | DESCRIPTION |
|---|---|---|---|---|---|---|---|---|
| X | X | X | X | X | X | X |   |   |
|   |   |   |   |   |   |   | 1 | CHARGING THROUGH NFC IS POSSIBLE. |

| 7 | 6 | 5 | 4 | 3 | 2 | 1 | 0 | DESCRIPTION |
|---|---|---|---|---|---|---|---|---|
| POWER CONSUMPTION | | | | | | | | POWER CONSUMPTION IS INDICATED. |

B

| 7 | 6 | 5 | 4 | 3 | 2 | 1 | 0 | DESCRIPTION |
|---|---|---|---|---|---|---|---|---|
| REMAINING CAPACITY | | | | | | | | REMAINING CAPACITY IS INDICATED. |

FIG. 9

| 7 | 6 | 5 | 4 | 3 | 2 | 1 | 0 | DESCRIPTION |
|---|---|---|---|---|---|---|---|---|
| Battery Level | | | | | | | | REMAINING BATTERY CAPACITY IS INDICATED. |
| Requested Charging Power Level | | | | | | | | CHARGING POWER AMOUNT REQUESTED BY POWER RECEIVING DEVICE IS INDICATED. POWER AMOUNT REQUESTED FROM CHARGING DEVICE IS INDICATED IN ACCORDANCE WITH REMAINING BATTERY CAPACITY (WHICH DIFFERS DEPENDING ON BATTERY CHARACTERISTICS). IN CASE IN WHICH REMAINING BATTERY CAPACITY IS LOW, MORE POWER IS REQUESTED, AND IN CASE IN WHICH REMAINING BATTERY CAPACITY IS HIGH, LESS POWER IS REQUESTED. 0 IS DESIGNATED IN CASE IN WHICH NO MORE POWER IS REQUESTED. |
| Requested Charging Time | | | | | | | | CHARGING TIME REQUESTED BY POWER RECEIVING DEVICE IS INDICATED (WHICH DIFFERS DEPENDING ON BATTERY CHARACTERISTICS). |

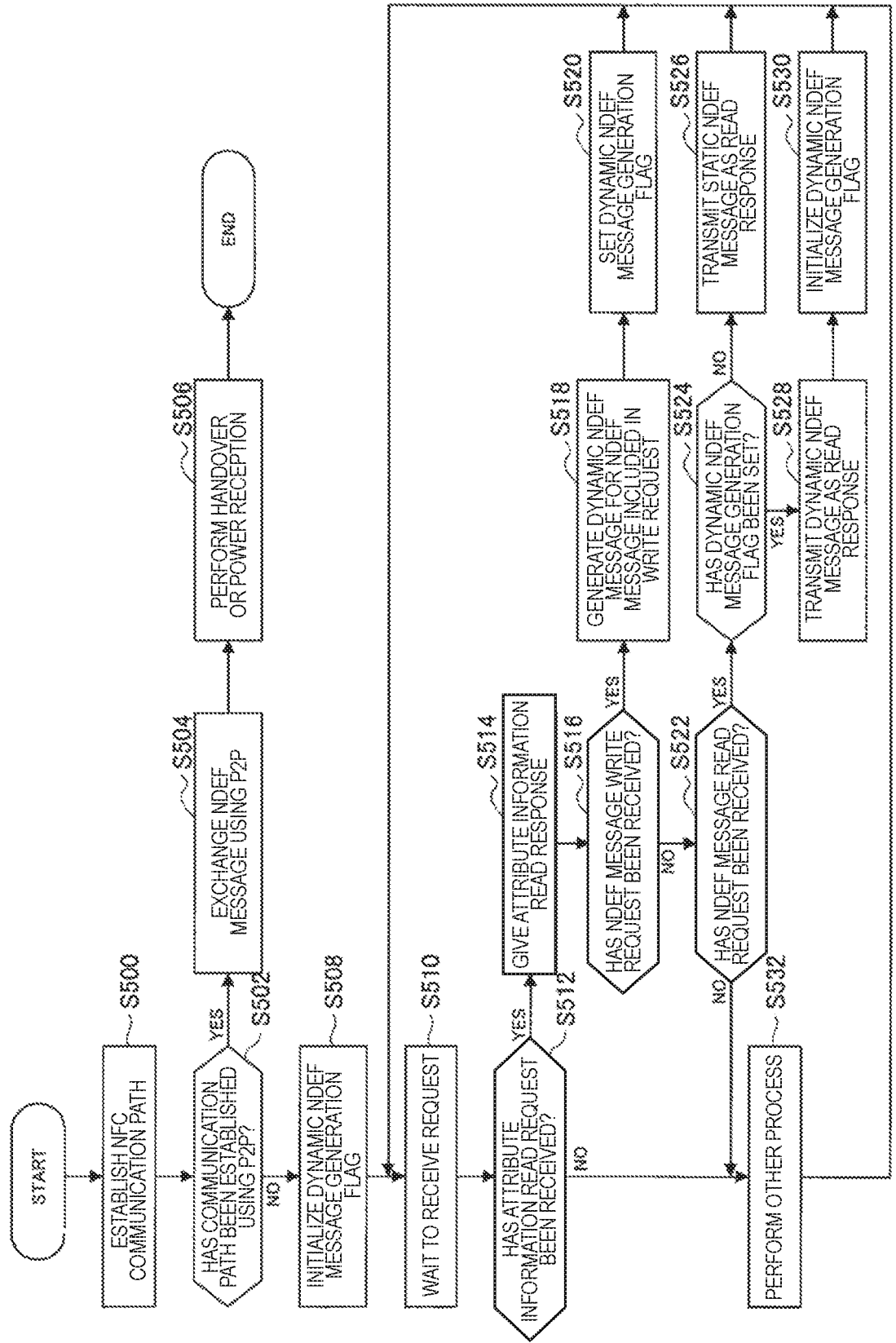

| Bluetooth Carrier Configuration Record<br>(mime-type "application/vnd.bluetooth.ep.oob")<br>(Payload ID "0") |
|---|
| - OOB Data Length (LENGTH)<br><br>- Device Address (BD_ADDR)<br><br>- Class of Device<br><br>- Simple Pairing Hash C<br><br>- Simple Pairing Randomizer R<br><br>- Service Class UUID<br><br>- Bluetooth Local Name |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/071959 (filed on Jul. 27, 2016) under 35 U.S.C. § 371, which claims priority to Japanese Patent Application No. 2015-174435 (filed on Sep. 4, 2015), which are all hereby incorporated by reference in their entirety.

TECHNICAL FIELD

The present disclosure relates to an information processing device, an information processing method, and a program.

BACKGROUND ART

In recent years, devices which can perform contactless communication with reader/writers (or devices with a reader/writer function; the same applies hereinbelow), for example, such as mobile telephones in which contactless integrated circuit (IC) cards or contactless IC chips are mounted have been widely distributed. Contactless communication such as near field communication (NFC) in which communication is performed using a magnetic field (a carrier) having a predetermined frequency of, for example, 13.56 [MHz] or the like is used between the device as described above which can perform contactless communication with a reader/writer and the reader/writer.

Here, in contactless communication, a reader/writer plays a role of an initiator which transmits a communication request including a command for starting communication, and the device as described above which can perform contactless communication with the reader/writer plays a role of a target which performs the communication on the basis of the communication request.

In addition, technologies relating to contactless communication have been developed. As a technology in which, when one device is set as an initiator and the other device is set as a target, the device operating as a target transmits data to the device operating as an initiator at an arbitrary timing, for example, the technology described in Patent Literature 1 below can be exemplified.

CITATION LIST

Patent Literature

Patent Literature 1: JP 2012-175265A

DISCLOSURE OF INVENTION

Technical Problem

As high functionality of devices which play a role of a target has advanced, devices which play the role of a target include those with a plurality of functions that are realized using contactless communication. Thus, a technology which can utilize the plurality of functions of a device playing a role of a target more effectively through contactless communication has been demanded.

The present disclosure proposes a novel and improved information processing device, information processing method, and program which enable functions of a device playing a role of a target in contactless communication which are realized using contactless communication to be more effectively utilized.

Solution to Problem

According to the present disclosure, there is provided an information processing device including: a processing unit configured to select a first processing mode in which static information is transmitted or a second processing mode in which dynamic information according to a process is transmitted on a basis of a predetermined request recognized in contactless communication with an external device and to perform a process corresponding to a selected processing mode. The processing unit selects the first processing mode in a case in which the recognized predetermined request is a read request for causing information to be transmitted and selects the second processing mode in a case in which the recognized predetermined request is a write request for causing information to be written in a recording medium.

In addition, according to the present disclosure, there is provided an information processing device including: a processing unit configured to sequentially perform processes corresponding to two or more respective functions of an external device on a basis of capability information indicating the functions acquired from the external device through contactless communication.

In addition, according to the present disclosure, there is provided an information processing method that is executed by an information processing device, the information processing method including: a step of selecting a first processing mode in which static information is transmitted or a second processing mode in which dynamic information according to a process is transmitted on a basis of a predetermined request recognized in contactless communication with an external device and performing a process corresponding to a selected processing mode. In the step of performing the process, the first processing mode is selected in a case in which the recognized predetermined request is a read request for causing information to be transmitted and the second processing mode is selected in a case in which the recognized predetermined request is a write request for causing information to be written in a recording medium.

In addition, according to the present disclosure, there is provided an information processing method that is executed by an information processing device, the information processing method including: a step of sequentially performing processes corresponding to two or more respective functions of an external device on a basis of capability information indicating the functions acquired from the external device through contactless communication.

In addition, according to the present disclosure, there is provided a program causing a computer to realize a function of selecting a first processing mode in which static information is transmitted or a second processing mode in which dynamic information according to a process is transmitted on a basis of a predetermined request recognized in contactless communication with an external device and performing a process corresponding to a selected processing mode. The function of performing the process selects the first processing mode in a case in which the recognized predetermined request is a read request for causing information to be transmitted and selects the second processing mode in a case in which the recognized predetermined request is a write request for causing information to be written in a recording medium.

In addition, according to the present disclosure, there is provided a program for causing a computer to realize a function of sequentially performing processes corresponding to two or more respective functions of an external device on a basis of capability information indicating the functions acquired from the external device through contactless communication.

Advantageous Effects of Invention

According to the present disclosure, functions of a device playing a role of a target in contactless communication which are realized using contactless communication are enabled to be utilized more effectively.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram for describing an information processing method according to a first embodiment.

FIG. 6 is an explanatory diagram for describing an information processing method according to a first embodiment.

FIG. 7 is an explanatory diagram for describing an information processing method according to a first embodiment.

FIG. 8 is an explanatory diagram for describing an information processing method according to a first embodiment.

FIG. 9 is an explanatory diagram for describing an information processing method according to a first embodiment.

FIG. 10 is a flowchart showing an example of a process relating to the information processing method according to the first embodiment.

MODE(S) FOR CARRYING OUT THE INVENTION

Figure 1:
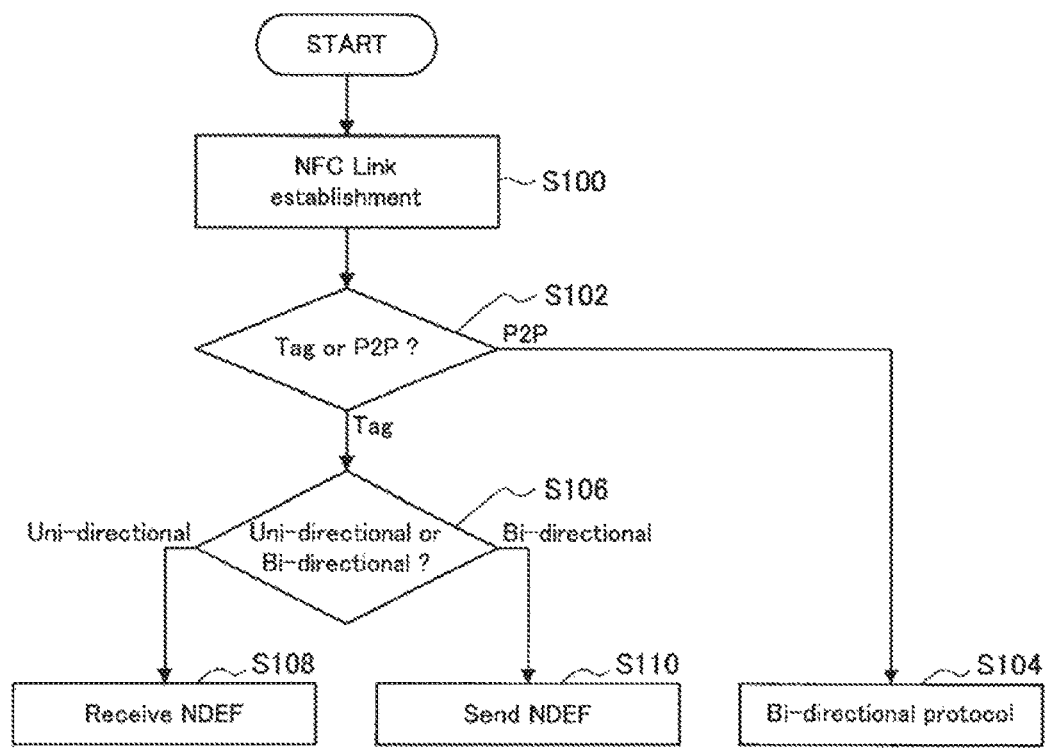
FIG. 1 is an explanatory diagram for describing an information processing method according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided below in the following order,

1. Information processing method and information processing device according to first embodiment
2. Information processing method and information processing device according to second embodiment
3. Information processing method and information processing device according to third embodiment
4. Program according to present embodiment A case in which contactless communication performed between devices is NFC will be exemplified below. Note that contactless communication according to the present embodiment is not limited to NFC, and it may be communication of another communication scheme (communication of an arbitrary communication scheme to which the information processing method according to the present embodiment can be applied), for example, such as arbitrary optical communication such as infrared light.

In addition, a case in which contactless communication is performed between a reader/writer device (which may be referred to as an "R/W device") and a tag device will be exemplified below.

Here, a reader/writer device according to the present embodiment is a device which plays, for example, a role of an initiator in contactless communication. As the reader/writer device according to the present embodiment, for example, a reader/writer (a device that functions as an interrogator with a function of actively transmitting carriers), a device with a reader/writer function, or the like is exemplified.

In addition, a tag device according to the present embodiment is a device which plays, for example, a role of a target in the contactless communication. As the tag device according to the present embodiment, for example, devices with integrated circuit (IC) tags, devices operating in a so-called card emulation (CE) mode, or the like are exemplified.

Information Processing Method and Information Processing Device According to First Embodiment First, an information processing method according to a first embodiment will be described. A case in which a process relating to the information processing method according to the first embodiment is performed by an information processing device according to the first embodiment will be exemplified below. The information processing device according to the first embodiment corresponds to a tag device among devices involved in contactless communication according to the present embodiment. Thus, the information processing device according to the first embodiment may be referred to as a "tag device according to the first embodiment" below for the sake of convenience in description.

[1] Overview of Information Processing Method According to First Embodiment

In NFC, communication is performed between devices using, for example, messages (which may be referred to as "NDEF messages" below) in a data format that is called "NFC Data Exchange Format (NDEF)" defined by an organization known as the NFC Forum.

In addition, in a case in which contactless communication is performed between devices using NFC, NDEF message-based protocols for the devices include the following two protocols.

Uni-directional protocol (which may be referred to as "uni-directional"): A protocol by which a process performed between devices is completed by one device transmitting an NDEF message. In a case in which communication is performed on the basis of the uni-directional protocol, the other device that has received the NDEF message transmits, for example, static information corresponding to the NDEF message.

Bi-directional protocol (Which may be referred to as "bi-directional"): A protocol by which a process performed between devices is completed by both devices transmitting NDEF messages. In a case in which communication is performed on the basis of the bi-directional protocol, the devices that have received the NDEF messages transmit, for example, dynamic information according to processes based on the NDEF messages.

Here, static information according to the present embodiment is data of which content is not changed by, for example, a process based on a request acquired through an NDEF message, or the like. In addition, dynamic information according to the present embodiment is data of which content can be changed by, for example, a process based on a request acquired through an NDEF message, or the like.

Figure 2:
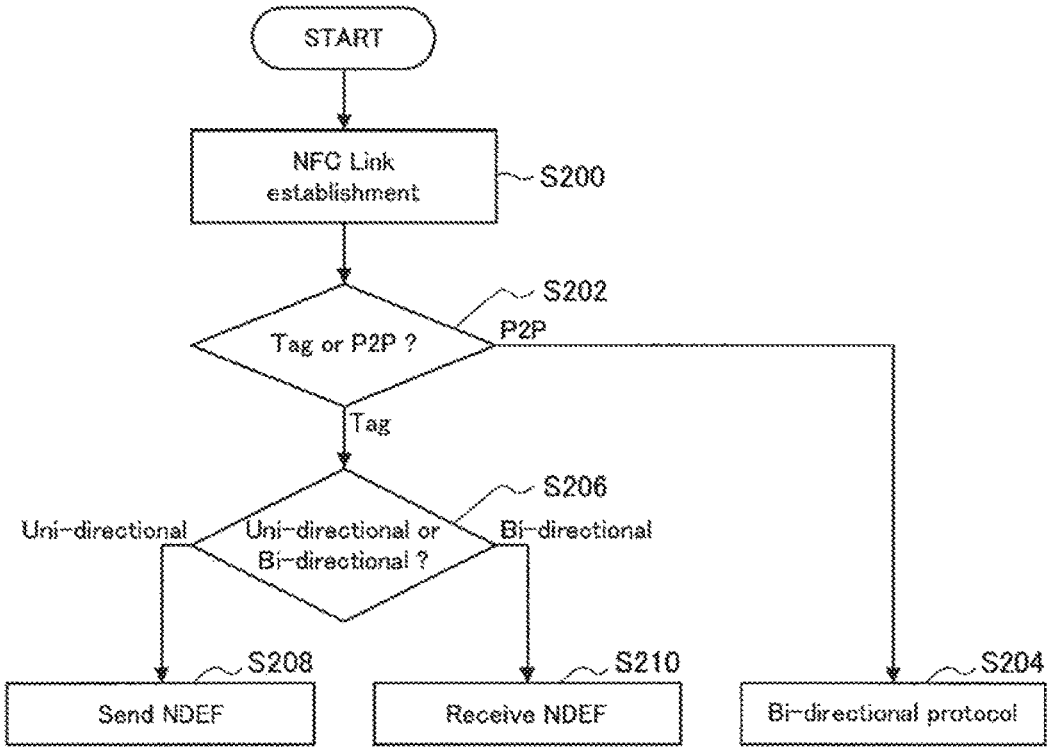
FIG. 2 is an explanatory diagram for describing an information processing method according to a first embodiment.

FIGS. 1 and 2 are explanatory diagrams for describing the information processing method according to the first embodiment. FIG. 1 shows an example of an existing process relating to decision of a protocol to be used by a device that is called a "requester" by the NFC Forum. In addition, FIG. 2 shows an example of an existing process relating to decision of a protocol to be used by a device that is called a "selector" by the NFC Forum.

First, the process for deciding a protocol to be used by a "requester" will be described with reference to FIG. 1. The process shown in FIG. 1 will be assumed to be performed by a reader/writer device below.

The reader/writer device establishes a communication path for contactless communication to be performed with a device to communicate with (S100). The communication path for contactless communication between the reader/writer device and the device to communicate with is established when, for example, the reader/writer device detects a tag device through polling and then mutual authentication between the reader/writer device and the device to communicate with is performed, or the like. An example of a process relating to establishment of a communication path for NFC will be described below.

When the communication path for contactless communication with the device to communicate with is established, the reader/writer device determines whether the device to communicate with is a tag device or a device with a peer-to-peer (P2P) function (S102). The reader/writer device makes the determination of Step S102 by acquiring information indicating a mode in which the device to communicate with is operating from the device.

In a case in which the device is determined to be a device with the P2P function in Step S102, the reader/writer device decides the bi-directional protocol as a protocol to be used in communication with the device to communicate with (S104).

In addition, in a case in which the device is determined to be a tag device in Step S102, the reader/writer device determines whether a protocol to be used in communication with the device to communicate with should be the mini-directional protocol or the bi-directional protocol (S106). The reader/writer device makes the determination of Step S106 with reference to, for example, a setting of an application or the like.

In a case in which a protocol to be used in communication with the device to communicate with is determined to be the uni-directional protocol in Step S106, the reader/writer device decides the uni-directional protocol as a protocol to be used in communication with the device to communicate with and performs communication using the decided protocol (S108). In addition, in a case in which a protocol to be used in communication with the device to communicate with is determined to be the bi-directional protocol in Step S106, the reader/writer device decides the bi-directional protocol as a protocol to be used in communication with the device to communicate with and performs communication using the decided protocol (S110).

Next, a process for deciding a protocol to be used by the "selector" will be described with reference to FIG. 2. It will be assumed below that a tag device performs the process shown in FIG. 2 and the tag device performs communication with the reader/writer device.

The tag device establishes a communication path for contactless communication to be performed with the reader/writer device (S200). The communication path for contactless communication between the reader/writer device and the tag device is established, for example, similarly to Step S100 of FIG. 1.

The tag device checks an operation mode (S102). As the operation mode, for example, a mode indicating an operation as a tag device (which may be referred to as a "tag mode" below) and a mode indicating an operation as a device with a P2P function (which may be referred to as a "P2P mode" below) are exemplified. The tag device makes the determination of Step S202 with reference to, for example, information indicating an operation mode stored in a recording medium.

In a case in which the mode is determined to be the P2P mode in Step S202, the tag device decides the bi-directional protocol as a protocol to be used in communication with the reader/writer device (S204).

In addition, in a case in which the mode is determined to be a tag mode in Step S202, the tag device determines whether a protocol to be used in communication with the reader/writer device should be the uni-directional protocol or the bi-directional protocol (S206). The tag device determines a pre-set protocol as a protocol to be used in communication with the reader/writer device.

In a case in which a protocol to be used in communication with the reader/writer device is determined to be the uni-directional protocol in Step S206, the tag device decides the uni-directional protocol as a protocol to be used in communication with the reader/writer device and performs communication using the decided protocol (S208). In addition, in a case in which a protocol to be used in communication with the reader/writer device is determined to be the bi-directional protocol in Step S206, the tag device decides the bi-directional protocol as a protocol to be used in communication with the reader/writer device and performs communication using the decided protocol (S210).

The protocols to be used in communication are decided each by the device called a "requester" and the device called a "selector" by the NFC Forum performing the processes of FIGS. 1 and 2.

Here, the tag device that performs an existing process decides a pre-set protocol as a protocol to be used in communication with the reader/writer device as shown in Steps S206 to S210 of FIG. 2. Thus, in a case in which the existing process is performed, even if the tag device has two functions which are a function of communicating using the uni-directional protocol and a function of communicating using the bi-directional protocol, the tag device can communicate only using the one pre-set protocol.

Thus, even if the existing process shown in FIG. 2 is used, it is hard to expect a plurality of functions of a device playing a role of a target like the tag device or the like to be utilized through contactless communication.

Thus, the tag device according to the first embodiment selects a first processing mode in which static information is transmitted or a second processing mode in which dynamic information according to a process is transmitted on the basis of a predetermined request recognized in con tactless communication with an external device such as the reader/writer device. Then, the tag device according to the first embodiment performs a process corresponding to the selected processing mode.

Here, as the predetermined request according to the present embodiment, a read request including a command for causing information (data) to be transmitted, or a write request including a command for causing information (data) to be written in a recording medium is exemplified. In addition, a write request may further include information to be written. Information to be transmitted in response to a read request is static information or dynamic information in accordance with a selected processing mode.

Note that the tag device according to the first embodiment can also exclude, for example, a specific request from such a predetermined request. As an example of a specific request excluded from a predetermined request, for example, a read request (which may be referred to as an "attribute information read request" below) for reading attribute information to be read first in an NDEF message-based protocol is exemplified. In addition, to exemplify the NDEF message-based protocol, the tag device according to the first embodiment does not recognize, for example, an attribute information read request as a predetermined request according to the present embodiment, but recognizes a read request for an NDEF message body or a write request for an NDEF message body as a predetermined request.

In a case in which a predetermined request is recognized when a flag indicating that one processing mode has been selected is not set, the tag device according to the first embodiment determines the recognized predetermined request to be the predetermined request that is recognized first. The above-described flag is set in a case in which, for example, the second processing mode has been selected. In addition, the above-described flag may be set in a case in which the first processing mode has been selected.

More specifically, the tag device according to the first embodiment performs a process corresponding to the first processing mode as shown in (1) below or a process corresponding to the second processing mode as shown in (2) below on the basis of the recognized predetermined request. The tag device according to the first embodiment performs, for example, the process corresponding to the second processing mode on the basis of a predetermined request determined to be recognized first as described above.

(1) Example of Process Corresponding to First Processing Mode

In a case in which the recognized predetermined request is a read request, the tag device according to the first embodiment selects the first processing mode. Then, the tag device according to the first embodiment performs the process corresponding to the selected first processing mode.

Here, the process corresponding to the first processing mode according to the present embodiment corresponds to a process performed in communication using the uni-directional protocol.

As the process corresponding to the first processing mode, for example, "a process of transmitting connection information for performing communication of another communication scheme different from contactless communication with an external device as static information" is exemplified. As the connection information according to the present embodiment, for example, information indicating a supported communication scheme and information for starting communication (for example, an ID and password) are exemplified.

By performing a process of transmitting connection information as the process corresponding to the first processing mode, for example, the tag device according to the first embodiment and an external device such as a reader/writer device can perform communication based on another communication scheme using the connection information. Thus, by performing the process of transmitting connection information as the process corresponding to the first processing mode, for example, "Connection Handover" (which may be referred to as "handover" below) defined by the NFC Forum is realized.

Figure 3:
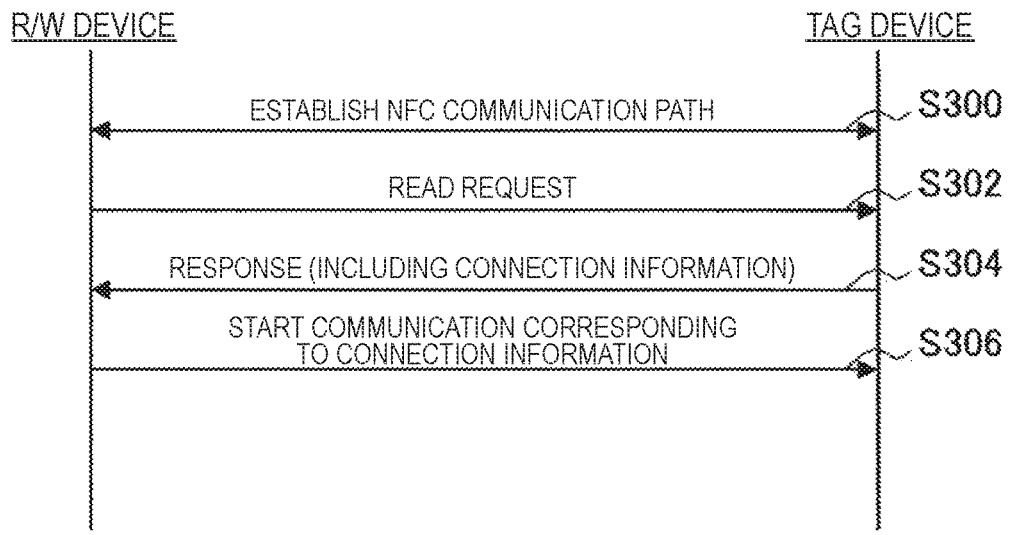
FIG. 3 is an explanatory diagram for describing an information processing method according to a first embodiment.

FIG. 3 is an explanatory diagram for describing the information processing method according to the first embodiment. FIG. 3 shows an example of a process performed in a case in which the tag device according to the first embodiment performs contactless communication based on NFC with a reader/writer device (an example of an external device). The process of Step S304 of FIG. 3 corresponds to an example of the process corresponding to the first processing mode of the tag device according to the first embodiment.

A communication path for NFC is established between the tag device and the reader/writer device according to the first embodiment, similarly to Step S100 of FIG. 1 (S300).

The reader/writer device transmits a read request for causing connection information to be transmitted (S302). The tag device according to the first embodiment that has received the read request transmitted in Step S302 reads the connection information (an example of static information) from a recording medium on the basis of the read request, and gives a response including the connection information to the reader/writer device (S304).

The reader/writer device that has received the response given in Step S304 starts communication based on a communication scheme corresponding to the connection information with the tag device according to the first embodiment using the acquired connection information (S306).

By performing the process shown in FIG. 3, for example, "connection handover" is realized between the reader/writer device and the tag device according to the first embodiment.

Note that the process corresponding to the first processing mode according to the present embodiment is not limited to the above-described "process of transmitting connection information as static information," but may be a process of transmitting arbitrary static information.

(2) Example of Process Corresponding to Second Processing Mode

In a case in which the recognized predetermined request is a write request, the tag device according to the first embodiment selects the second processing mode. Then, the tag device according to the first embodiment performs the process corresponding to the selected second processing mode.

Here, the process corresponding to the second processing mode according to the present embodiment corresponds to a process performed in communication using the bi-directional protocol.

As the process corresponding to the second processing mode, for example, a "process of transmitting information relating to power reception as dynamic information" is exemplified. As the information relating to power reception according to the present embodiment, for example, various kinds of information relating to power reception such as authentication response information (which will be described below) and control response information (which will be described below) are exemplified.

By performing the process of transmitting information relating to power reception as the process corresponding to the second processing mode, for example, the tag device according to the first embodiment can gain power from an external device such as the reader/writer device through the communication path for the contactless communication.

Figure 4:
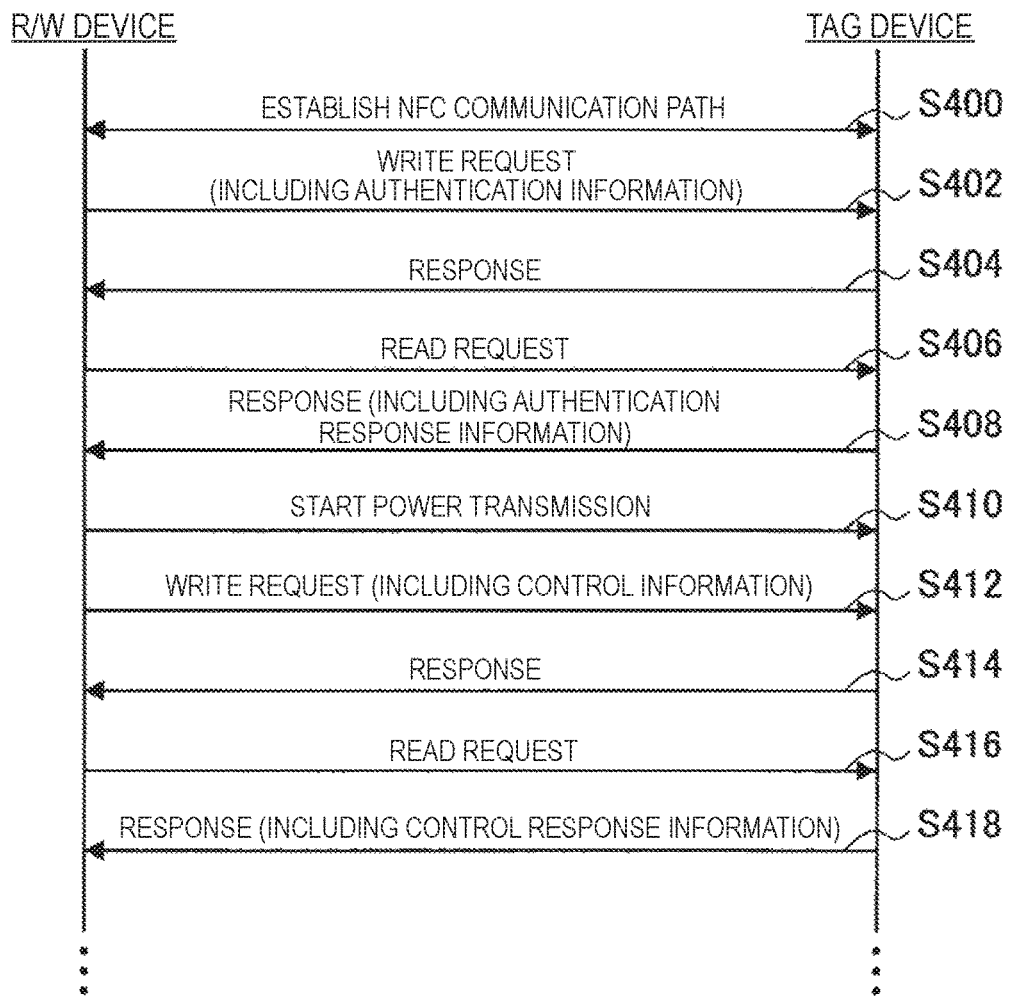
FIG. 4 is an explanatory diagram for describing an information processing method according to a first embodiment.

FIG. 4 is an explanatory diagram for describing the information processing method according to the first embodiment. FIG. 4 shows an example of a process performed in a case in which the tag device according to the first embodiment performs contactless communication based on NFC with a reader/writer device (an example of an external device). The processes of Steps S408 and S418 of FIG. 4 correspond to an example of the process corresponding to the second processing mode of the tag device according to the first embodiment.

A communication path for NFC is established between the tag device and the reader/writer device according to the first embodiment, similarly to Step S100 of FIG. 1 (S400).

The reader/writer device transmits a write request including authentication information (S402). The authentication information according to the present embodiment is data for performing authentication relating to charging between the reader/writer device and the tag device according to the first embodiment. As the authentication information, for example, data or the like indicating a charging control scheme supported by the reader/writer device is exemplified.

FIG. 5 is an explanatory diagram for describing the information processing method according to the first embodiment, showing examples of the authentication information. FIG. 5 shows an example of the authentication information for a charging scheme in which charging is possible expressed with bits as shown in A of FIG. 5. In addition, FIG. 5 shows that, for example, charging based on NFC is possible when a value of a bit corresponding to "0" shown in B of FIG. 5 is "1." Note that authentication information is not limited to the expression of a charging scheme in which charging is possible using bits as shown in A of FIG. 5. In authentication information, a charging scheme in which charging is possible may be expressed using an arbitrary method which can express the charging scheme in which charging is possible.

The tag device according to the first embodiment that has received the write request transmitted in Step S402 records the authentication information in a recording medium on the basis of the write request, and gives a response indicating a process result to the reader/writer device (S404).

The reader/writer device that has received the response given in Step S404 transmits a read request for causing authentication response information to be transmitted (S406). The authentication response information according to the present embodiment is data indicating a response corresponding to the authentication information transmitted in Step S402. As the authentication response information, data indicating a power reception control scheme supported by the tag device according to the first embodiment, for example, such as Text Record Type Definition (RTD) defined by the NFC Forum, is exemplified. As a specific example of the authentication response information, for example, data of a charging scheme in which power reception is possible expressed with bits similarly to the authentication information shown in FIG. 5 is exemplified.

Note that the authentication response information is not limited to data similar to the authentication information shown in FIG. 5.

FIG. 6 is an explanatory diagram for describing the information processing method according to the first embodiment, showing an example of the authentication response information. As shown in A of FIG. 6, the authentication response information may include, for example, information indicating a charging scheme in which charging is possible ("Charging Technology Capability" shown in A of FIG. 6) and information indicating communication attributes of applicable communication ("Communication Attributes" shown in A of FIG. 6).

An example of information indicating a charging scheme is, for example, the example shown in B of FIG. 6. The information indicating the charging scheme shown in B of FIG. 6 indicates that charging based on NFC is possible when, for example, a value of a bit corresponding to "0" shown in B of FIG. 6 is "1."

In addition, an example of the information indicating communication attributes is, for example, the example shown in C of FIG. 6. The information indicating communication attributes shown in C of FIG. 6 indicates that, for example, the hi-directional protocol is supported when the value of a bit corresponding to "0" shown in C of FIG. 6 is "0," and the uni-directional protocol is supported when the value of the bit corresponding to "0" shown in C of FIG. 6 is "1."

The tag device according to the first embodiment that has received the read request transmitted in Step S406 generates the authentication response information on the basis of the read request and the recorded authentication information, and gives a response including the authentication response information to the reader/writer device (S408).

The reader/writer device that has received the response given in Step S408 starts power transmission using the communication path for the contactless communication in a charging control scheme corresponding to the authentication response information (S410).

In addition, when the power transmission is started, the reader/writer device transmits a write request including control information (S412). The control information according to the present embodiment is data for controlling charging to the tag device according to the first embodiment. As the control information, for example, data including a command for causing data indicating a state of the tag device according to the first embodiment (which will be described below) to be transmitted to the tag device according to the first embodiment is exemplified.

FIG. 7 is an explanatory diagram for describing the information processing method according to the first embodiment, showing an example of the control information. As shown in A of FIG. 7, for example, the control information includes information indicating a charging scheme used by the reader/writer device ("Charging Technology" shown in A of FIG. 7). As the information indicating a charging scheme, for example, the example shown in B of FIG. 7 is exemplified. The information indicating a charging scheme shown in B of FIG. 7 indicates that charging based on NFC is possible when, for example, the value of a bit corresponding to "0" shown in B of FIG. 7 is "1."

The tag device according to the first embodiment that has received the write request transmitted in Step S412 records the control information in a recording medium on the basis of the write request and gives a response indicating a process result to the reader/writer device (S414).

The reader/writer device that has received the response given in Step S414 transmits a read request for causing control response information to be transmitted (S416). The control response information according to the present embodiment is data indicating a response corresponding to the control information transmitted in Step S412. As the control response information, for example, data indicating a state of the tag device according to the first embodiment is exemplified. Here, as data indicating a state of the tag device according to the first embodiment, for example, one or two or more of data indicating a process execution state of the tag device according to the first embodiment, data indicating power consumption of the tag device according to the first embodiment, data indicating a remaining capacity of a power source such as a battery included in the tag device according to the first embodiment, and data indicating power received by the tag device according to the first embodiment in the contactless communication are exemplified.

FIG. 8 is an explanatory diagram for describing the information processing method according to the first embodiment, showing an example of the control response information. The control response information shown in A of FIG. 8 shows an example of data (an example of data indicating a state of the tag device according to the first embodiment) indicating power consumption, and the control response information shown in B of FIG. 8 shows an example of data (another example of the data indicating a state of the tag device according to the first embodiment) indicating a remaining capacity of a power source.

Note that the control response information according to the present embodiment is not limited to the examples shown in FIG. 8.

FIG. 9 is an explanatory diagram for describing the information processing method according to the first embodiment, showing another example of the control response information.

The control response information may include, for example, one or two or more of information ("Battery Level" shown in FIG. 9) indicating a remaining capacity of a battery (an example of a power source), information ("Requested Charging Power Level" shown in FIG. 9) indicating a charging power amount requested by a power receiving device, and information ("Requested Charging Time" shown in FIG. 9) indicating a charging time requested by the power receiving device as shown in FIG. 9. Here, the tag device according to the first embodiment corresponds to the above-described power receiving device.

The information indicating a remaining capacity of a battery indicates a remaining capacity of a battery included in a power receiving device such as the tag device according to the first embodiment.

Here, since the control response information includes the information indicating a remaining capacity of a battery, for example, a display screen of a display device included in a power transmitting device such as the reader/writer device or a display screen of a display device included in another device connected to a power transmitting device in a wired or wireless manner can be caused to display a remaining capacity of a battery indicated by the information indicating a remaining capacity of a battery. In addition, the remaining capacity of a battery indicated by the information indicating a remaining capacity of a battery may be output from, for example, an audio output device such as a speaker using sound.

The information indicating a charging power amount indicates a charging power amount requested by a power receiving device such as the tag device according to the first embodiment.

The tag device according to the first embodiment specifies a charging power amount corresponding to a remaining capacity of a battery included in the tag device according to the first embodiment with reference to, for example, a table (or a database) in which the remaining capacity of a battery is associated with the charging power amount. In the above-described table in which the remaining capacity of a battery is associated with the charging power amount includes, for example, such a charging power amount is associated with a remaining capacity of a battery that more power is supplied as a remaining capacity of a battery is lower. In addition, in the above-described table in which the remaining capacity of a battery is associated with the charging power amount, for example, such a value (e.g., "0") that no more power will be supplied may be associated with the remaining capacity of a battery. Furthermore, the above-described table in which the remaining capacity of a battery is associated with the charging power amount may differ depending on a type of the battery or the like. The above-described table in which the remaining capacity of a battery is associated with the charging power amount is stored in, for example, the recording medium included in the tag device according to the first embodiment or an external recording medium connected to the tag device according to the first embodiment.

The information indicating a charging time indicates a charging time requested by a power receiving device such as the tag device according to the first embodiment.

The tag device according to the first embodiment specifies a charging time corresponding to a remaining capacity of a battery included in the tag device according to the first embodiment with reference to, for example, a table (or a database) in which the remaining capacity of a battery is associated with the charging time. In the above-described table in which the remaining capacity of a battery is associated with the charging time includes, for example, such a charging time is associated with a remaining capacity of a battery that power is supplied for a longer time as a remaining capacity of a battery is lower. In addition, in the above-described table in which the remaining capacity of a battery is associated with the charging time, for example, such a value (e.g., "0") that no more power will be supplied may be associated with the remaining capacity of a battery. Furthermore, the above-described table in which the remaining capacity of a battery is associated with the charging time may differ depending on a type of the battery or the like. The above-described table in which the remaining capacity of a battery is associated with the charging time is stored in, for example, the recording medium included in the tag device according to the first embodiment or an external recording medium connected to the tag device according to the first embodiment.

The tag device according to the first embodiment that has received the read request transmitted in Step S416 generates the control response information on the basis of the read request, the recorded control information, and the like and gives a response including the control response information to the reader/writer device (S418). Content (a parameter or the like) of the control response information generated by the tag device according to the first embodiment can be changed depending on, for example, contactless communication with the reader/writer device or information relating to a power source such as a remaining capacity of a battery (an example of a power source).

Here, a power source such as the above-described battery may be a power source included in the tag device according to the first embodiment or a power source included in an external device (e.g., a device playing a role of a host with respect to the tag device according to the first embodiment, or the like) connected to the tag device according to the first embodiment. In a case in which the above-described power source is a power source included in an external device, the tag device according to the first embodiment can change the content of the control response information on the basis of information relating to the power source included in the external device.

The processes of Steps S412 to S418 are repeated while the reader/writer device and the tag device according to the first embodiment perform the power transmission. In addition, the reader/writer device stops the power transmission in a case in which a predetermined condition that, for example, power is transmitted for a predetermined period of time, a predetermined amount of power is transmitted, or the like is satisfied. In addition, the reader/writer device can also stop the power transmission on the basis of, for example, a change of load impedance of the tag device (an example of an external device to be charged by the reader/writer device) according to the first embodiment as will be shown in a third embodiment that will be described below.

By performing the processes shown in FIG. 4, for example, the tag device according to the first embodiment can gain power from the reader/writer device (an example of an external device) using the communication path for the contactless communication.

In addition, in a case in which an end of power reception is detected when charging from the reader/writer device (an example of an external device) is being performed through contactless communication, the tag device according to the first embodiment may notify the reader/writer device of the end of power reception, for example. The tag device according to the first embodiment detects the end of power reception on the basis of, for example, information relating to power reception such as authentication response information or control response information.

In a case in which a predetermined condition is satisfied, like a case in which power has been transmitted for a predetermined period of time, a case in which a predetermined amount of power has been transmitted, a case in which a predetermined amount of power has been accumulated in a power source such as the battery, a case in which an operation to cause power reception to be stopped has been detected, a case in which two or more thereof are satisfied, or the like, for example, the tag device according to the first embodiment determines that an end of power reception has been detected.

The tag device according to the first embodiment notifies the reader/writer device (an example of an external device) of the end of power reception by, for example, transmitting a signal indicating the end of power reception in contactless communication.

Note that a method for the tag device according to the first embodiment to notify the reader/writer device (an example of an external device) of the end of power reception is not limited to the above.

For example, the tag device according to the first embodiment can notify the reader/writer device (an example of an external device) of the end of power reception by changing impedance.

In a case in which the tag device according to the first embodiment performs contactless communication with the reader/writer device (an example of an external device) using load modulation as will be described below, for example, the tag device according to the first embodiment changes impedance by controlling a state of a load relating to the load modulation. As a load relating to load modulation, for example, a load Z included in a load modulation circuit 182 shown in FIG. 14 which will be described below is exemplified.

More specifically, the tag device according to the first embodiment changes impedance by switching the load relating to load modulation to an on-state from an off-state and maintaining the on-state.

By the tag device according to the first embodiment controlling a state of the load relating to load modulation as described above, for example, a load impedance of the tag device according to the first embodiment with respect to the reader/writer device is changed. For this reason, by detecting the change of the load impedance of the tag device according to the first embodiment, the reader/writer device can recognize the end of power reception of the tag device according to the first embodiment, without receiving the signal indicating the end of power reception in contactless communication. Thus, the tag device according to the first embodiment can notify the reader/writer device (an example of an external device) of the end of power reception by changing impedance, without causing the signal indicating the end of power reception to be transmitted using arbitrary communication such as contactless communication.

In a case in which the notification of the end of power reception has been issued by changing impedance, the tag device according to the first embodiment switches the load relating to load modulation from the off-state to the on-state in a case in which a predetermined condition is satisfied. As the above-described predetermined condition, for example, a condition that a predetermined period of time elapses from a start of power reception, a condition that it is no longer possible to make sure about power reception from the reader/writer device (an example of an external device), or the like is exemplified.

The tag device according to the first embodiment can notify the reader/writer device (an example of an external device) of the end of power reception using, for example, the method as described above. Note that the above-described method for the tag device according to the first embodiment to notify the reader/writer device (an example of an external device) of the end of power reception can be applied to a tag device according to a second embodiment or an arbitrary device serving as a charging target in contactless communication.

Note that a process corresponding to the second processing mode according to the present embodiment is not limited to the above-described "process of transmitting information relating to power reception," and may be a process of transmitting arbitrary dynamic information.

The tag device according to the first embodiment selects the first processing mode or the second processing mode on the basis of a recognized predetermined request as described in (1) and (2) above and performs a process corresponding to the selected processing mode.

Here, the process corresponding to the first processing mode corresponds to a process performed through communication using the uni-directional protocol, and the process corresponding to the second processing mode corresponds to a process performed through communication using the bi-directional protocol.

Thus, the tag device according to the first embodiment can switch the uni-directional protocol and the hi-directional protocol in accordance with a request acquired from the reader/writer device (an example of an external device).

In addition, with application of the information processing method according to the first embodiment, the tag device such as a device operating with an IC tag or in a CE mode can be supported by not only the uni-directional protocol but also the bi-directional protocol. Accordingly, the tag device can be caused to have a plurality of functions and the tag device can be applied to more use cases. As an example, one tag device can be caused to implement a handover function (an example of the process performed through communication using the uni-directional protocol) and a power reception function (an example of the process performed through communication using the bi-directional protocol).

Therefore, the information processing method according to the first embodiment enables the functions of the tag device (which corresponds to a device playing a role of a target in contactless communication) which are realized using contactless communication to be utilized more effectively.

[2] Example of Process Relating to Information Processing Method According to First Embodiment Next, an example of a process relating to the above-described information processing method according to the first embodiment will be introduced.

A case in which a process relating to the information processing method according to the first embodiment is performed by the tag device according to the first embodiment (an example of the information processing device according to the first embodiment) and contactless communication with the reader/writer device an example of an external device) is performed using NFC will be exemplified below.

In addition, a case in which the tag device according to the first embodiment has a handover function of performing handover and a power reception function of receiving power based on NFC will be exemplified below. Handover is assumed to be realized by the process performed through communication using the uni-directional protocol, i.e., the process corresponding to the first processing mode, and power reception based on NFC is assumed to be realized by the process performed through communication using the bi-directional protocol, i.e., the process corresponding to the second processing mode.

FIG. 10 is a flowchart showing an example of the process relating to the information processing method according to the first embodiment.

The tag device according to the first embodiment establishes a communication path for NFC between the tag device and the reader/writer device (S500).

Here, methods for establishing a communication path for NFC differ depending on protocols to be used, and the methods for establishing a communication path for NFC in accordance with protocols are defined by the NFC Forum as specifications. Specific examples of methods for establishing a communication path for NFC in accordance with protocols to be used are as follows.

Case of Type 1 Tag Protocol: A communication path for NFC is established by exchanging a SENS_REQ command and a SENS_RES response, and an RID command and a RID response in order.

Case of Type 2 Tag Protocol: A communication path for NFC is established by exchanging a SENS_REQ command and a SENS_RES response, an SDD_REQ command and an SDD_RES response, and an SEL_REQ command and an SEL_RES response in order.

Case of Type 3 Tag Protocol: A communication path for NFC is established by exchanging a SENSF_REQ command and a SENSF_RES response.

Case of Type 4A Tag Protocol: A communication path for NFC is established by exchanging a SENS_REQ command and a SENS_RES response, an SDD_REQ command and an SDD_RES response, an SEL_REQ command and an SEL_RES response, and a RATS command and an ATS response in order.

Case of Type 4B Tag Protocol: A communication path for NFC is established by exchanging a SENSB_REQ command and a SENSB_RES response, and an ATTRIB command and an ATTRIB response in order.

Case of P2P Protocol: A communication path for NFC is established by exchanging an ATR_REQ command and an ATR_RES response with specific payloads.

When a communication path for NFC is established, the tag device according to the first embodiment determines whether or not a communication path has been established using a P2P protocol (S502).

In the case in which a communication path is determined to have been established using the P2P protocol in Step S502, the tag device according to the first embodiment exchanges NDEF messages with the reader/writer device using the P2P protocol (S504). Then, the tag device according to the first embodiment performs, for example, handover or power reception in accordance with the process of Step S504 (S506).

Figure 11:
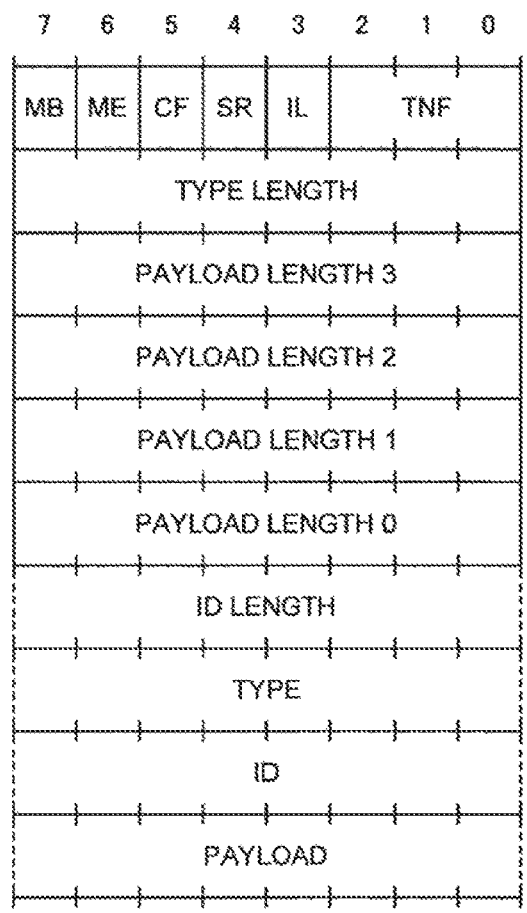
FIG. 11 is an explanatory diagram for describing an information processing method according to a first embodiment.

FIG. 11 is an explanatory diagram for describing the information processing method according to the first embodiment, showing an example of an NDEF message.

Using the TYPE field included in the NDEF message shown in FIG. 11, details of the process are identified.

In a case in which the NDEF message indicates handover, for example, the reader/writer device and the tag device according to the first embodiment exchange a handover request message and a handover select message with each other. In a case in which handover is performed, communication based on a communication scheme other than NFC is started in compliance with setting information included in the handover request message and the handover select message.

In addition, in a case in which the NDEF message indicates charging, for example, the reader/writer device and the tag device according to the first embodiment exchange messages relating to power transmission including the information as described with reference to FIG. 4, for example. In a case in which charging from the reader/writer device to the tag device according to the first embodiment is performed, for example, power is transmitted from the reader/writer device to the tag device according to the first embodiment on the basis of the information as described with reference to FIG. 4.

The example of the process relating to the information processing method according to the first embodiment will be described again with reference to FIG. 10. In a case in which it is not determined that a communication path has been established using the P2P protocol in Step S502, the tag device according to the first embodiment initializes a dynamic NDEF message generation flag (S508). The tag device according to the first embodiment initializes the dynamic NDEF message generation flag by, for example, "deleting the dynamic NDEF message generation flag in a case in which the dynamic NDEF message generation flag is stored in the recording medium" or "setting a value of the dynamic NDEF message generation flag stored in the recording medium to a value indicating a null state."

Here, the dynamic NDEF message generation flag is an example of a flag indicating that the second processing mode has been selected. The tag device according to the first embodiment determines a recognized predetermined request to be the predetermined request that is recognized first when, for example, the dynamic NDEF message generation flag is in an initialized state.

When the dynamic NDEF message generation flag is initialized in Step S508, the tag device according to the first embodiment waits to receive a request (a command) transmitted from the reader/writer device (S510).

When the request is received, the tag device according to the first embodiment determines whether or not an attribute information read request has been received (S512). Here, attribute information is information read first using an NDEF message-based protocol, and after the attribute information is read, an NDEF message body is read or written.

In a case in which the attribute information read request is determined to have been received in Step S512, the tag device according to the first embodiment gives an attribute information read response (S514).

Here, the attribute request read method differs depending on a protocol to be used. Specific examples of the attribute request read method in accordance with a protocol to be used are as follows.

Case of Type 1 Tag Protocol: A capability container is transmitted when read commands (RALL, READ, RSEG, and READ8) for Block 1 (capability container) are received.

Case of Type 2 Tag Protocol: A capability container is transmitted when a read command READ for Block 3 (capability container) is received.

Case of Type 3 Tag Protocol: NDEF attribute information is transmitted when a read command CHECK for Block 0 (NDEF attribute information) is received.

Case of Type 4 Tag Protocol: A capability container file is selected due to a capability container select command, and then a capability container is transmitted as response to a capability container read command.

When the process of Step S514 is performed, the tag device according to the first embodiment determines whether or not an NDEF message write request has been received (S516).

Here, the NDEF message write request differs depending on a protocol to be used. Specific examples of the NDEF message write request and a method of response to the write request in accordance with a protocol to be used are as follows.

Case of Type 1 Tag Protocol: When a write command (WRITE-E, WRITE-NE, WRITE-E8, or WRITE-NE8) including Block 2 and subsequent blocks is received, an NDEF message received along block numbers designated by the command is constructed, and a response is made. The transmission may be performed with a plurality of commands and responses.

Case of Type 2 Tag Protocol: When a write command (WRITE) including Block 4 and subsequent blocks is received, an NDEF message received along block numbers designated by the command is constructed, and a response is made. The transmission may be performed with a plurality of commands and responses.

Case of Type 3 Tag Protocol: When a write command (UPDATE) including Block 1 and subsequent blocks is received, an NDEF message received along block numbers designated by the command is constructed, and a response is made. The transmission may be performed with a plurality of commands and responses.

Case of Type 4 Tag Protocol: An NDEF data file is selected due to an NDEF select command, then an NDEF message is received due to an NDEF write command, and then a response is made.

In a case in which the NDEF message write request is determined to have been received in Step S516, the tag device according to the first embodiment processes the NDEF message included in the write request, and generates an NDEF message (which will be referred to as a "dynamic NDEF message" below) for a dynamic response in accordance with a process result (S518).

Since FIG. 10 shows an example in which power reception based on NFC is performed through communication using the bi-directional protocol, the tag device according to the first embodiment ascertains that the TYPE field of the NDEF message indicates charging (authentication information or control information). In addition, the tag device according to the first embodiment generates authentication response information with respect to the authentication information or control response information with respect to the control information, and sets the generated authentication response information or the generated control response information as a dynamic NDEF message.

When the process of Step S518 is performed, the tag device according to the first embodiment sets a dynamic NDEF message generation flag (S520). Then, the tag device according to the first embodiment repeats the processes from Step S510.

Here, the tag device according to the first embodiment sets the dynamic NDEF message generation flag by recording the dynamic NDEF message generation flag indicating a value indicating a valid state in the recording medium. Note that, in a case in which the dynamic NDEF message generation flag indicating the value indicating the valid state has already been stored in the recording medium, the tag device according to the first embodiment may not perform the process of Step S520.

In addition, in a case in which it is not determined that a NDEF message write request has been received in Step S516, the tag device according to the first embodiment determines whether or not an NDEF message read request has been received (S522).

Here, the NDEF message read request differs depending on a protocol to be used. Specific examples of the NDEF message read request and methods of response with respect to the read request in accordance with protocols to be used are as follows.

Case of Type 1 Tag Protocol: When read commands (RAIL, READ, RSEG, and READ8) including Block 2 and subsequent blocks are received, an NDEF message is transmitted as a response in accordance with block numbers designated by the command. The transmission may be performed with a plurality of commands and responses.

Case of Type 2 Tag Protocol: When a read command (READ) including Block 4 and subsequent blocks is received, an NDEF message is transmitted as a response in accordance with block numbers designated by the command. The transmission may be performed with a plurality of commands and responses.

Case of Type 3 Tag Protocol: When a read command (CHECK) including Block 1 and subsequent blocks is received, an NDEF message is transmitted as a response in accordance with block numbers designated by the command. The transmission may be performed with a plurality of commands and responses.

Case of Type 4 Tag Protocol: An NDEF data file is selected due to an NDEF select command, and then an NDEF data file is transmitted as a response to an NDEF read command.

In a case in which it is not determined that an NDEF message read request has been received in Step S522, the tag device according to the first embodiment performs the process of Step S532, which will be described below.

In addition, in a case in which it is determined that an NDEF message read request has been received in Step S522, the tag device according to the first embodiment determines whether or not a dynamic NDEF message generation flag has been set (S524).

Here, the process of Step S524 corresponds to determining whether or not a recognized NDEF message read request is a predetermined request that is recognized first. In a case in which it is not determined that a dynamic NDEF message generation flag has been set, the tag device according to the first embodiment determines that the recognized NDEF message read request is a predetermined request that is recognized first.

In a case in which it is not determined that a dynamic NDEF message generation flag has been set in Step S524, the tag device according to the first embodiment transmits an NDEF message including static information as a response to the recognized NDEF message read request (S526). Then, the tag device according to the first embodiment repeats the processes from Step S510.

In addition, in a case in which it is determined that a dynamic NDEF message generation flag has been set in Step S524, the tag device according to the first embodiment transmits an NDEF message including dynamic information corresponding to a process result with respect to the read request as a response to the recognized NDEF message read request (S528).

When the process of Step S528 is performed, the tag device according to first embodiment initializes a dynamic NDEF message generation flag, similarly to Step S508 (S530). Then, the tag device according to the first embodiment repeats the processes from Step S510.

Here, the process of Step S530 corresponds to a process of cancelling the set flag. That is, the processes of Steps S524, S528, and S530 are an example of a process of cancelling a flag in a case in which a process with respect to a read request is performed when the flag is set.

In a case in which it is not determined that an attribute information read request has been received in Step S512 or a case in which it is not determined that an NDEF message read request has been received in Step S522, the tag device according to the first embodiment performs a process other than reading or writing an NDEF message (S532). Then, the tag device according to the first embodiment repeats the processes from Step S510.

The tag device according to the first embodiment performs the process shown in FIG. 10, for example, as the process relating to the information processing method according to the first embodiment. By performing the process shown in FIG. 10, the tag device according to the first embodiment realizes switching between handover and power reception through NFC based on the NDEF message read request or NDEF message write request recognized in contactless communication with the reader/writer device.

Thus, by performing the process shown in FIG. 10, for example, functions of the tag device according to the first embodiment (an example of a device playing a role of a target in contactless communication) which are realized using contactless communication are enabled to be more effectively utilized. Note that it is needless to say that an example of the process relating to the information processing method according to the first embodiment is not limited to the example shown in FIG. 10.

[3] Example of Configuration of Information Processing Device According to First Embodiment Next, an example of a configuration of an information processing device according to the first embodiment which can perform the above-described process relating to the information processing method according to the first embodiment will be introduced. The information processing device according to the first embodiment corresponds to the above-described tag device according to the first embodiment.

Figure 12:
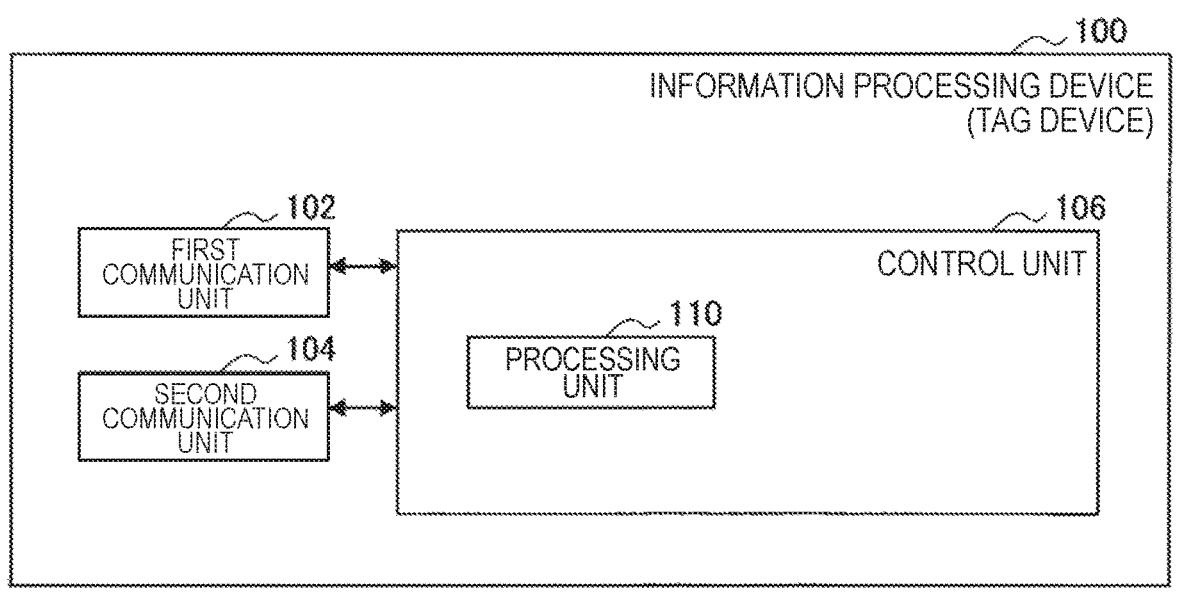
FIG. 12 is a block diagram illustrating an example of a configuration of an information processing device according to the first embodiment.

FIG. 12 is a block diagram illustrating an example of a configuration of the information processing device 100 according to the first embodiment. The information processing device 100 includes, for example, a first communication unit 102, a second communication unit 104, and a control unit 106.

In addition, the information processing device 100 may also include, for example, a read only memory (ROM, which is not illustrated), a random access memory (RAM, which is not illustrated), a storage unit (which is not illustrated), an operation unit (which is not illustrated) operable by a user, a display unit (which is not illustrated) that displays various screens on a display screen, and the like. The information processing device 100 has the above-described constituent elements connected to each other by, for example, a bus serving as a data transmission path. The information processing device 100 is driven by, for example, power supplied from an internal power source such as a battery included in the information processing device 100, power supplied from an external power source connected thereto, or the like.

The ROM (which is not illustrated) stores control data such as a program, arithmetic parameters, and the like to be used by the control unit 106. The RAM (which is not illustrated) temporarily stores a program and the like to be executed by the control unit 106.

The storage unit (which is not illustrated) is a storage means included in the information processing device 100, which stores data relating to the information processing method according to the first embodiment, for example, such as a dynamic NDEF message generation flag (an example of a flag according to the present embodiment), and various kinds of data of applications or the like. Here, as the storage unit (which is not illustrated), for example, a magnetic recording medium such as a hard disk, a non-volatile memory such as a flash memory, or the like is exemplified. In addition, the storage unit (which is not illustrated) may be detachable from the information processing device 100. In addition, the storage unit (which is not illustrated) may be a recording medium with tampering resistance such as a non-volatile memory included in an IC chip which will be described below.

As the operation unit (which is not illustrated), an operation input device which will be described below is exemplified. In addition, as the display unit (which is not illustrated), a display device which will be described below is exemplified.

[Example of Hardware Configuration of Information Processing Device 100]

Figure 13:
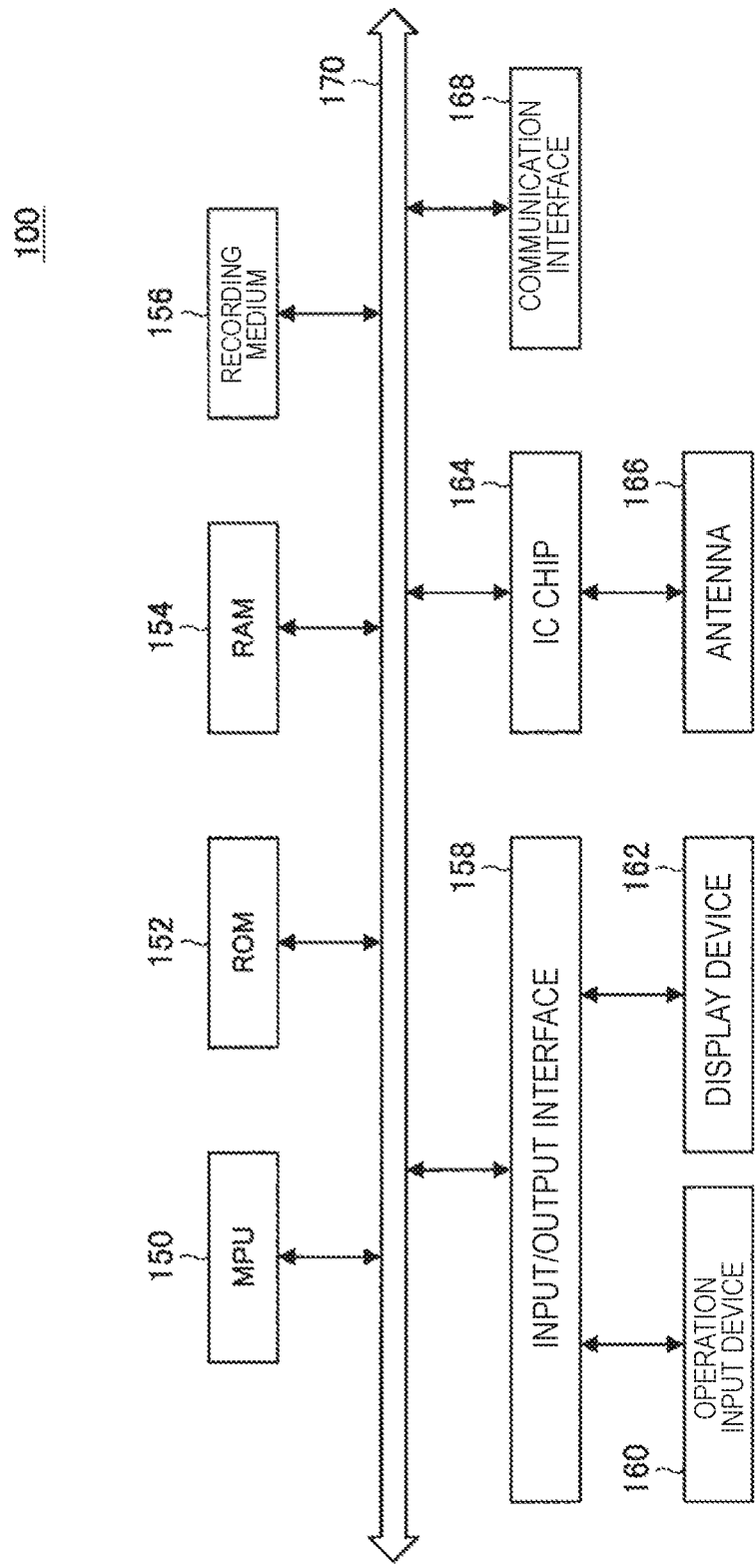
FIG. 13 is an explanatory diagram illustrating an example of a hardware configuration of the information processing device according to the first embodiment.

FIG. 13 is an explanatory diagram illustrating an example of a hardware configuration of the information processing device 100 according to the first embodiment. The information processing device 100 includes, for example, an MPU 150, a ROM 152, a RAM 154, a recording medium 156, an input/output interface 158, an operation input device 160, a display device 162, an IC chip 164, an antenna 166, and a communication interface 168. In addition, the information processing device 100 has the constituent elements connected to each other by, for example, a bus 170 serving as a data transmission path.

The MPU 150 includes, for example, one or two or more processors, various processing circuits, and the like including arithmetic circuits such as micro-processing units (MPUs), and functions as the control unit 106 which controls the entire information processing device 100. In addition, the MPU 150 plays a role of, for example, the processing unit 110, which will be described below, in the information processing device 100. Note that the processing unit 110 may include a dedicated (or a versatile) circuit (e.g., a separate processor from the MPU 150, or the like) which can execute processes of the processing unit 110.

The ROM 152 stores control data, and the like such as programs and arithmetic parameters to be used by the MPU 150. The RAM 154 temporarily stores, for example, a program to be executed by the MPU 150, and the like.

The recording medium 156 functions as the storage unit (which is not illustrated), for example, and stores data relating to the information processing method according to the first embodiment such as a dynamic NDEF message generation flag (an example of a flag according to the present embodiment), and various kinds of data of applications or the like. Here, as the recording medium 156, for example, a magnetic recording medium such as a hard disk, or a non-volatile memory such as a flash memory is exemplified. In addition, the recording medium 156 may be detachable from the information processing device 100. In addition, the storage unit (which is not illustrated) may be a recording medium with tampering resistance such as a non-volatile memory (which will be described below) included in the IC chip 164.

The input/output interface 158 connects, for example, the operation input device 160 and the display device 162. The operation input device 160 functions as an operation unit (which is not illustrated), and the display device 162 functions as a display unit (which is not illustrated). Here, as the input/output interface 158, for example, a Universal Serial Bus (USB) terminal, a digital visual interface (DVI) terminal, a High-Definition Multimedia interface (HDMI) (registered trademark) terminal, various processing circuits, and the like are exemplified.

In addition, the operation input device 160 is provided, for example, on the information processing device 100 and connected to the input/output interface 158 inside the information processing device 100. As the operation input device 160, for example, buttons, arrow keys, a rotation-type selector such as a jog dial, a combination thereof, or the like are exemplified.

Furthermore, the display device 162 is provided on, for example, the information processing device 100, and connected to the input/output interface 158 inside the information processing device 100. As the display device 162, for example, a liquid crystal display, an organic electro-luminescence (EL) display (also called an organic light emitting diode (OLED) display), or the like is exemplified.

Note that it is needless to say that the input/output interface 158 can also be connected to an external device such as an external operation input device (e.g., a keyboard, a mouse, or the like) or an external display device of the information processing device 100. In addition, the display device 162 may be a device, for example, such as a touch panel capable of display and user operations.

The IC chip 164 and the antenna 166 are one communication means included in the information processing device 100 and function as the first communication unit 102. The IC chip 164 and the antenna 166 perform contactless communication based on NFC with an external device such as the reader/writer device using a carrier with a predetermined frequency of, for example, 13.56 [MHz], or the like. The antenna 166 receives carriers and plays a role of transmitting response signals. In addition, the IC chip 164 demodulates and processes a carrier signal transmitted from an external device such as the reader/writer device on the basis of a received carrier and causes a response signal to be transmitted using load modulation.

Figure 14:
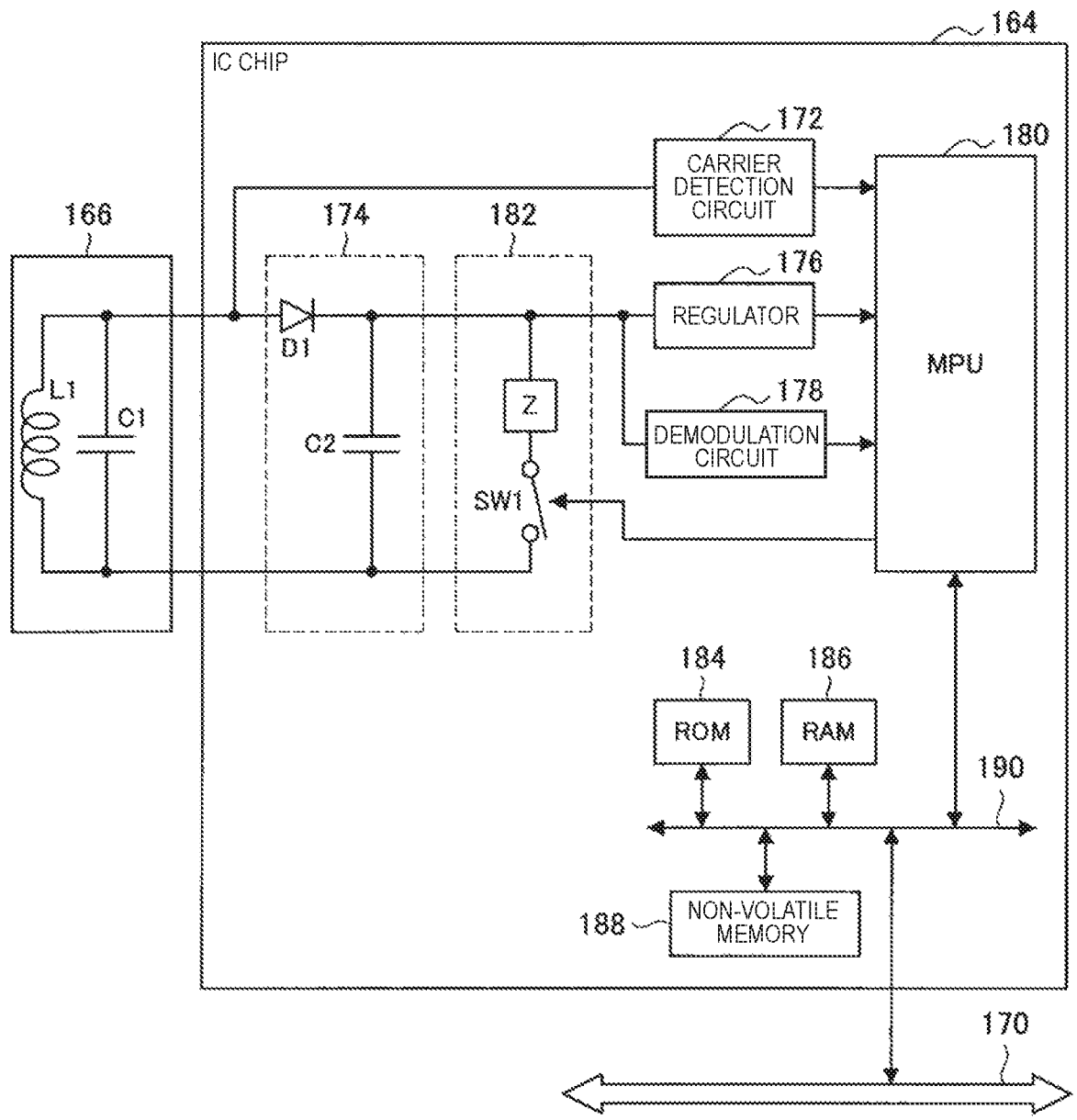
FIG. 14 is an explanatory diagram illustrating an example of a configuration of an IC chip and an antenna illustrated in FIG. 13.

FIG. 14 is an explanatory diagram illustrating an example of a configuration of the IC chip 164 and the antenna 166 illustrated in FIG. 13. Note that the information processing device 100 may not have, for example, the configuration of the IC chip 164 illustrated in FIG. 14 in the form of an IC chip.

The antenna 166 includes, for example, a resonance circuit including a coil (inductor) L1 having a predetermined inductance and a capacitor C1 having a predetermined electrostatic capacity, and causes an induced voltage to be generated through electromagnetic induction in accordance with reception of a carrier. In addition, the antenna 166 outputs a reception voltage obtained by causing the induced voltage to resonate at a predetermined resonance frequency. Here, the resonance frequency of the antenna 166 is set in accordance with a frequency of a carrier, for example, like a frequency of 13.56 [MHz], or the like. With the above-described configuration, the antenna 166 receives carriers and transmits response signals using load modulation performed by the load modulation circuit 182 included in the IC chip 164.

The IC chip 164 includes, for example, a carrier detection circuit 172, a detector circuit 174, a regulator 176, a demodulation circuit 178, an MPU 180, and the load modulation circuit 182. Note that, although not illustrated in FIG. 14, the IC chip 164 may further include, for example, a protection circuit (which is not illustrated) for preventing an overvoltage or an overcurrent from being applied to the MPU 180. Here, as the protection circuit (which is not illustrated), for example, a clamp circuit including a diode, or the like is exemplified.

In addition, the IC chip 164 includes, for example, a ROM 184, a RAM 186, and a non-volatile memory 188. The MPU 180, the ROM 184, the RAM 186, and the non-volatile memory 188 are connected by, for example, a bus 190 serving as a data transmission path. Furthermore, the bus 190 is connected to the bus 170.

The ROM 184 stores control data such as programs and arithmetic parameters to be used by the MPU 180. The RAM 186 temporarily stores a program to be executed by the MPU 180, arithmetic results, execution states, and the like.

The non-volatile memory 188 stores, for example, data relating to the information processing method according to the first embodiment such as the above-described authentication information and the above-described control information, and various kinds of data of applications, or the like. Here, as the non-volatile memory 188, for example, an electrically erasable and programmable read only memory (EEPROM), a flash memory, and the like are exemplified. In addition, the non-volatile memory 188 has, for example, tampering resistance.

The carrier detection circuit 172 generates, for example, a rectangular detection signal on the basis of a reception voltage conveyed from the antenna 166 and conveys the detection signal to the MPU 180. In addition, the MPU 180 uses the above-described conveyed detection signal as, for example, a processing clock for data processing. Here, since the above-described detection signal is based on the reception voltage conveyed from the antenna 166, the detection signal is synchronized with the frequency of a carrier transmitted from an external device such as the reader/writer device. Thus, the IC chip 164 can perform a process to be performed between the IC chip 164 and an external device such as the reader/writer device in synchronization with the external device since the IC chip includes the carrier detection circuit 172.

The detector circuit 174 rectifies the reception voltage output from the antenna 166. Here, the detector circuit 174 includes, for example, a diode D1 and a capacitor C2.

The regulator 176 smoothens the reception voltage such that the reception voltage becomes a constant voltage, and outputs a drive voltage to the MPU 180. Here, the regulator 176 uses DC components of the reception voltage as a drive voltage.

The demodulation circuit 178 demodulates a carrier signal on the basis of the reception voltage, and outputs data (e.g., binarized data signals of a high level and a low level) corresponding to the carrier signal included in the carrier. Here, the demodulation circuit 178 outputs AC components of the reception voltage as data.

The MPU 180 is driven using the drive voltage output from the regulator 176 as a power source, and processes the data demodulated by the demodulation circuit 178. Here, the MPU 180 includes, for example, one or two or more processors, various processing circuits, and the like including arithmetic circuits such as MPUs.

Here, the MPU 180 of the information processing device 100 may perform the process relating to the information processing method according to the first embodiment. In other words, the MPU 180 of the information processing device 100 can also play a role of the processing unit 110.

In addition, the MPU 180 selectively generates a control signal for controlling load modulation relating to a response to an external device such as the reader/writer device in accordance with a process result. Then, the MPU 180 selectively outputs the control signal to the load modulation circuit 182.

The load modulation circuit 182 includes, for example, a load Z and a switch SW1, and performs load modulation by selectively connecting the load Z (making the load Z active) in accordance with the control signal conveyed from the MPU 180. Here, the load. Z includes, for example, a resistor having a predetermined resistance value. In addition, the switch SW1 includes, for example, a p-channel metal oxide semiconductor field effect transistor (MOSFET) or an n-channel MOSFET With the above-described configuration, the IC chip 164 can process the carrier signal received by the antenna 166 and can cause the antenna 166 to transmit a response signal using load modulation.

The IC chip 164 and the antenna 166 perform contactless communication based on NFC with an external device such as the reader/writer device using a carrier having a predetermined frequency, for example, by having the configuration illustrated in FIG. 14. Note that it is needless to say that the configuration of the IC chip 164 and the antenna 166 according to the present embodiment is not limited to the example illustrated in FIG. 14.

The example of the hardware configuration of the information processing device 100 according to the first embodiment will be described again with reference to FIG. 13. The communication interface 168 is another communication means included in the information processing device 100 and functions as the second communication unit 104.

The communication interface 168 performs wireless or wired communication with an external device such as the reader/writer device, for example, via a network (or directly). As the network according to the present embodiment, for example, a wired network such as a local area network (LAN) or a wide area network (WAN), a wireless network such as a wireless local area network (a wireless LAN), the Internet using a communication protocol such as transmission control protocol/Internet protocol (TCP/IP), and the like are exemplified.

Here, as the communication interface 168, for example, a communication antenna and a radio frequency (RF) circuit (for wireless communication), an IEEE 802.15.1 port and a transmission/reception circuit (for wireless communication), an IEEE 802.11 port and a transmission/reception circuit (for wireless communication), a LAN terminal and a transmission/reception circuit (for wired communication), or the like are exemplified. In addition, the communication interface 168 can also have a configuration corresponding to a network, or a configuration corresponding to an arbitrary standard of a USB terminal and a transmission/reception circuit, or the like on which communication is possible. Furthermore, the communication interface 168 may have a configuration in which communication can be performed with one or two or more external devices and the like using a plurality of communication schemes.

The information processing device 100 performs the process relating to the information processing method according to the first embodiment using, for example, the configuration illustrated in FIG. 13. Note that a hardware configuration of the information processing device 100 according to the first embodiment is not limited to the configuration illustrated in FIG. 13.

For example, in a case in which the information processing device 100 does not have the handover function or communication with an external device is performed via an external communication device with a communication function similar to that of the communication interface 168, the information processing device may not include the communication interface 168.

In addition, the information processing device 100 can have a configuration in which, for example, one or two or more of the recording medium 156, the operation input device 160, and the display device 162 are not included.

Furthermore, a part of or the whole of the configuration illustrated in FIG. 13 (or a configuration according to a modified example) may be realized by, for example, one or two or more ICs.

The example of the configuration of the information processing device 100 will be described again with reference to FIG. 12. The first communication unit 102 is one communication means included in the information processing device 100 and performs contactless communication based on NFC or the like with an external device such as the reader/writer device.

Here, as the first communication unit 102, for example, communication devices such as the IC chip 164 and the antenna 166 relating to NFC are exemplified. Note that the first communication unit 102 may be a communication device relating to con tactless communication other than NFC, such as a communication device relating to arbitrary optical communication such as infrared light.

The second communication unit 104 is another communication means included in the information processing device 100 and performs communication with an external device such as the reader/writer device in a different communication scheme from that of the first communication unit 102. Communication of the second communication unit 104 is controlled by, for example, the control unit 106.

Here, as the second communication unit 104, for example, an IEEE 802.15.1 port and a transmission/reception circuit, and the like are exemplified. Note that a configuration of the second communication unit 104 is not limited to the above. The second communication unit 104 can have, for example, a configuration corresponding to an arbitrary standard of a USB terminal and a transmission/reception circuit, or the like on which communication is possible or an arbitrary configuration in which communication with an external device is possible via a network.

The control unit 106 includes, for example, an MPU or the like, and plays a role of controlling the information processing device 100 overall. In addition, the control unit 106 includes, for example, the processing unit 110, and plays a main role of performing the process relating to the information processing method according to the first embodiment.

The processing unit 110 plays the main role of performing the process relating to the information processing method according to the first embodiment. The processing unit 110 selects the first processing mode or the second processing mode on the basis of a predetermined request recognized in contactless communication performed with an external device. In addition, the processing unit 110 performs a process corresponding to the selected processing mode. Here, in a case in which the recognized predetermined request is a read request, the processing unit 110 selects the first processing mode, and in a case in which the recognized predetermined request is a write request, the processing unit 110 selects the second processing mode.

Then, the processing unit 110 performs a process corresponding to the selected processing mode.

To exemplify a specific example, the processing unit 110 selects the first processing mode or the second processing mode on the basis of the recognized predetermined request as described in, for example, (1) or (2) above and performs a process corresponding to the selected processing mode. The processing unit 110 selects the first processing mode or the second processing mode on the basis of, for example, a predetermined request that has been determined to be recognized first. In addition, in a case in which the first processing mode is selected, for example, the processing unit 110 transmits connection information as static information. Furthermore, in a case in which the second processing mode is selected, for example, the processing unit 110 transmits information relating to power reception as dynamic information. Note that static information is not limited to connection information and dynamic information is not limited to information relating to power reception as described above.

In addition, in a case in which an end of the power reception is detected when information relating to power reception is transmitted as dynamic information and charging from an external device is performed on the basis of the information relating to power reception using contactless communication, the processing unit 110 may change impedance. The processing unit 110 changes impedance by, for example, switching a load such as the load Z illustrated in FIG. 14 relating to load modulation from an off-state to an on-state and maintaining the on-state.

By changing the impedance as described above, the processing unit 110 can notify the external device which is performing the charging through contactless communication of the end of the power reception, without causing a signal indicating the end of the power reception to be transmitted to the external device using arbitrary communication such as contactless communication.

Here, in a case in which, when a flag indicating that one processing mode has been selected is not set as in Step S524 of FIG. 10, a predetermined request is recognized, for example, the processing unit 110 determines the recognized predetermined request to be the predetermined request that is recognized first.

In addition, in the case in which the second processing mode has been selected, for example, the processing unit 110 sets a flag as shown in Steps S516 to S520 of FIG. 10. Note that the processing unit 110 can also set a flag in the case in which the first processing mode has been selected.

Furthermore, in a case in which, when a flag is set, a process according to a read request is performed, for example, the processing unit 110 cancels the flag as shown in Steps S524, S528, and S530 of FIG. 10.

By including the processing unit 110, for example, the control unit 106 takes the lead at performing the process relating to the information processing method according to the first embodiment.

With the configuration shown in FIG. 12, for example, the information processing device 100 takes the lead at performing the process relating to the information processing method according to the first embodiment.

Here, the information processing device 100 selects the first processing mode or the second processing mode on the basis of a recognized predetermined request and performs a process corresponding to the selected processing mode.

As described above, the process corresponding to the first processing mode corresponds to a process performed through communication using the uni-directional protocol, and the process corresponding to the second processing mode corresponds to a process performed through communication using the bi-directional protocol.

Thus, the information processing device 100 can switch the uni-directional protocol and the bi-directional protocol on the basis of a request acquired from an external device such as the reader/writer device.

In addition, the information processing device 100 which plays a role of a target in contactless communication can be supported by not only the uni-directional protocol but also the bi-directional protocol by applying the information processing method according to the first embodiment. Thus, it is possible to give the information processing device 100 a plurality of functions and to apply the information processing device 100 to more use cases.

Therefore, the functions of the information processing device 100 (which corresponds to a device playing a role of a target in contactless communication) which performs the process relating to the information processing method according to the first embodiment which are realized using contactless communication are enable to be utilized more effectively in the information processing device 100.

In addition, the information processing device 100 can exhibit an effect obtained by performing the above-described process relating to the information processing method according to the first embodiment.

Note that a configuration of the information processing device according to the first embodiment is not limited to the configuration illustrated in FIG. 12.

The information processing device according to the first embodiment can include, for example, the processing unit 110 illustrated in FIG. 12 separately from the control unit 106 (e.g., realized by another processing circuit).

Furthermore, in a case in which communication with an external device is performed via an external communication device with functions and a configuration similar to those of the first communication unit 102, the information processing device according to the first embodiment may not include the first communication unit 102.

In addition, in the case in which the information processing device according to the first embodiment does not have the handover function or performs communication with an external device via an external communication device with functions and a configuration similar to those of the second communication unit 104, the information processing device according to the first embodiment may not include the second communication unit 104.

The information processing device 100 according to the first embodiment can be applied to a tag device according to the present embodiment, for example, such as an IC tag, or a device that operates in a so-called CE mode. Here, as a device which operates in the CE mode, various devices which can perform the process relating to the information processing method according to the first embodiment, for example, a communication device such as a mobile telephone or a smartphone, a tablet-type device, a computer such as a personal computer (PC), and the like are exemplified. In addition, the present embodiment can also be applied to, for example, a processing IC which can be incorporated into the above-described devices.

Information Processing Method and Information Processing Device According to Second Embodiment Next, as an information processing method according to the second embodiment, "an information processing method for enabling a plurality of functions of a device, which plays a role of a target in contactless communication and has the functions using the uni-directional protocol, to be utilized more effectively" will be described.

A case in which a process relating to the information processing method according to the second embodiment is performed by an information processing device according to the second embodiment will be exemplified below. The information processing device according to the second embodiment corresponds to a reader/writer device among devices which perform contactless communication according to the present embodiment. Thus, the information processing device according to the second embodiment may be referred to as a "reader/writer device according to the second embodiment" below for the sake of convenience in description. In addition, a case in which a device which plays a role of a target in contactless communication is a tag device will be exemplified below.

Furthermore, a case in which a tag device has two or more functions that are realized using contactless communication, including a handover function and a power reception function will be exemplified below. Note that it is needless to say that one or both of the handover function and the power reception function may not be included in the two or more functions of the tag device that are realized using contactless communication.

[1] Overview of Information Processing Method According to Second Embodiment

The reader/writer device according to the second embodiment causes two or more functions of a tag device an example of an external device) which performs contactless communication to be utilized more effectively by sequentially performing processes corresponding to the respective functions of the tag device.

The reader/writer device according to the second embodiment specifies two or more functions of the tag device by acquiring capability information indicating the two or more functions of the tag device in contactless communication. Then, the reader/writer device according to the second embodiment sequentially performs processes corresponding to the two or more respective specified functions of the tag device.

FIGS. 15 to 18 are explanatory diagrams for describing the information processing method according to the second embodiment, showing examples of capability information according to the present embodiment. FIGS. 15 to 18 show examples of power information in a case in which the tag device conveys a plurality of functions including the handover function to the reader/writer device according to the second embodiment.

An example of a method for conveying the plurality of functions by the tag device in a case in which contactless communication is performed between devices using NDEF messages will be described below with reference to FIGS. 15 to 18.

Figure 15:
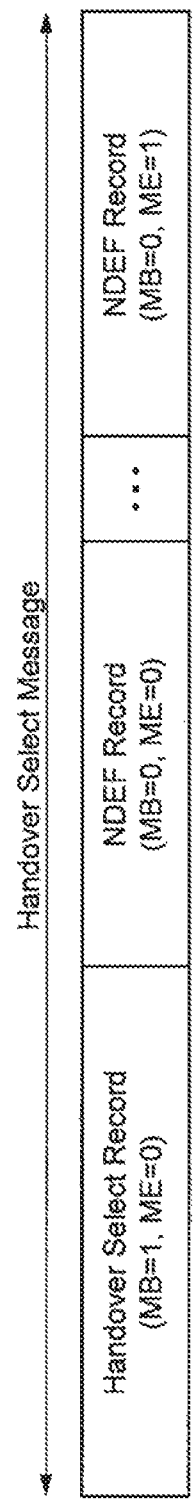
FIG. 15 is an explanatory diagram for describing an information processing method according to a second embodiment.

An NDEF message defined by the NFC Forum has a configuration shown in, for example. FIG. 15. Here, "MB" and "ME" shown in FIG. 15 indicate compartmentalization of data included in an NDEF message. In addition, the value of "MB" which is 1 indicates that data is the first data of the NDEF message and the value of "ME" which is 1 indicates that data is the final data of the NDEF message.

Figures 16, 17:
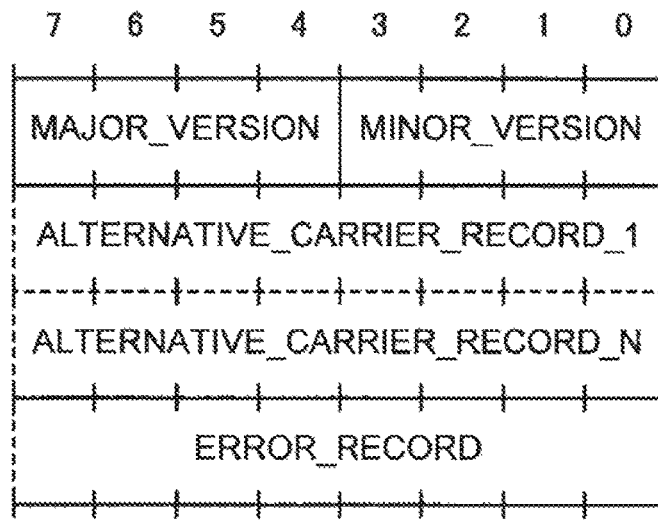
FIG. 16 is an explanatory diagram tier describing an information processing method according to a second embodiment.
FIG. 17 is an explanatory diagram for describing an information processing method according to a second embodiment.

Handover Select Record included in the NDEF message has "Hs" set in a TYPE field. FIG. 16 shows content of a payload of Handover Select Record.

NDEF Record included in the NDEF message stores connection information relating to a communication scheme other than NFC. FIG. 17 shows an example of connection information relating to a communication scheme corresponding to the IEEE 802.15.1 standard.

Figure 18:
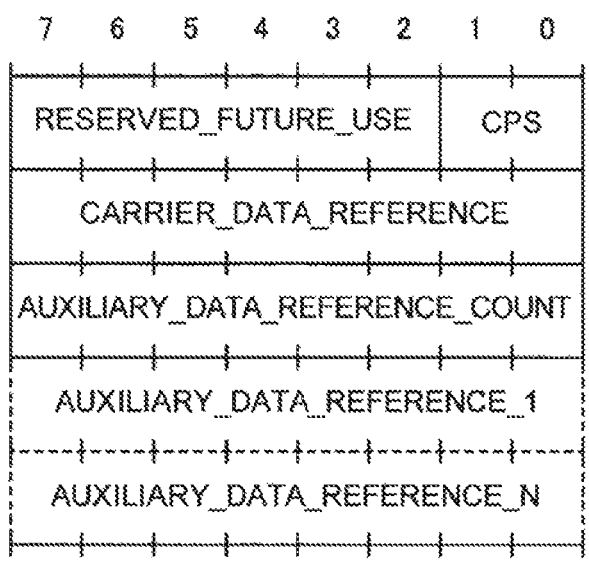
FIG. 18 is an explanatory diagram for describing an information processing method according to a second embodiment.

In addition, ALTERNATIVE_CARRIER_RECORD included in Handover Select Record included in the NDEF message is defined in FIG. 18.

CARRIER_DATA_REFERENCE stores a relative number of NDEF Record (e.g., connection information) succeeding to Handover Select Record. A relative number of a first record is "0."

Here, in the second embodiment, the tag device stores authentication response information relating to a function other than the handover function, such as authentication response information relating to power reception (e.g., data of a charging scheme in which power reception is possible expressed with bits, similarly to the authentication information shown in FIG. 5) in NDEF record included in Handover Select message. By storing the authentication response information relating to the function other than the handover function in NDEF record included in Handover Select message, the tag device can convey two or more functions including the handover function to the reader/writer device according to the second embodiment using the uni-directional protocol.

The reader/writer device according to the second embodiment specifies two or more functions of the tag device by acquiring the capability information as shown with reference to, for example, FIGS. 15 to 18 from the tag device.

In addition, the reader/writer device according to the second embodiment sequentially performs processes corresponding to the two or more respective specified functions of the tag device. Specifically, the reader/writer device according to the second embodiment sequentially performs the processes corresponding to the two or more respective specified functions of the tag device as described in (I) to (IV) below.

(I) First Example for Processes Performed by Reader/Writer Device According to Second Embodiment The reader/writer device according to the second embodiment sequentially performs the processes corresponding to the two or more respective specified functions of the tag device in prescribed order.

As the prescribed order, for example, order specified from acquired capability information, order (reverse order) reversed to the order specified from the acquired capability information, and the like are exemplified.

In a case in which capability information shown with reference to FIGS. 15 to 18 has been acquired, for example, the reader/writer device according to the second embodiment performs a process relating to the handover function (a process of starting communication based on a communication scheme corresponding to a communication function), and then performs a process relating to another function such as a process relating to the power reception function (a process of controlling charging corresponding to the power reception function that uses contactless communication).

(II) Second Example for Processes Performed by Reader/Writer Device According to Second Embodiment In a case in which capability information includes information indicating order of processes, for example, the reader/writer device according to the second embodiment sequentially performs processes corresponding to the two or more respective specified functions of the tag device in the order prescribed in the capability information.

(III) Third Example for Processes Performed by Reader/Writer Device According to Second Embodiment The reader/writer device according to the second embodiment sets order of processes on the basis of capability information. Then, the reader/writer device according to the second embodiment sequentially performs the processes corresponding to the two or more respective specified functions of the tag device in the set order.

The reader/writer device according to the second embodiment sets processing priorities on the two or more respective specified functions of the tag device on the basis of, for example, capability information, and then sets processing order such that a process for which a higher priority is set is performed first. Here, the reader/writer device according to the second embodiment sets the processing priorities using, for example, a table (or a database) in which the types of processes and the processing priorities are associated. Note that a method of setting the processing priorities is not limited to the above, and priorities may be set using an arbitrary method such as setting priorities on the basis of a user operation in which priorities can be set.

Here, as an example of setting processing priorities, "setting a higher priority for the process relating to the handover function (a process of starting communication based on a communication scheme corresponding to a communication function) than a priority of a process relating to another function such as the process relating to the power reception function (a process of controlling charging corresponding to the power reception function that uses contactless communication)" is exemplified. In a case in which priorities are set as in the above-described setting example, the reader/writer device according to the second embodiment performs the process relating to the handover function (the process of starting communication based on a communication scheme corresponding to a communication function), and then performs the process relating to the other function such as the process relating to the power reception function (the process of controlling charging corresponding to the power reception function that uses contactless communication).

Note that the processes described in the third example are not limited to the above-described examples. For example, the reader/writer device according to the second embodiment can also randomly sort two or more functions of the tag device specified on the basis of capability information and sequentially perform processes corresponding to the two or more respective specified functions of the tag device in ascending or descending order.

(IV) Fourth Example for Processes Performed by Reader/Writer Device According to Second Embodiment The reader/writer device according to the second embodiment can also sequentially perform processes corresponding to the two or more respective specified functions of the tag device by combining arbitrary processes that can be combined, for example, a "combined process of the processes described in (I) and (II) above," a "combined process of the processes described in (II) and (III) above," or the like.

In a case in which the "combined process of the processes described in (I) and (II) above" or the "combined process of the processes described in (II) and (III) above" is performed, the reader/writer device according to the second embodiment performs the processes described in (II) in a case in which information indicating order of the processes is included in the capability information, and performs the other process in a case in which information indicating order of the processes is not included in the capability information.

The reader/writer device according to the second embodiment sequentially performs the processes corresponding to the two or more respective specified functions of the tag device as described in (I) to (IV) above.

Thus, the reader/writer device according to the second embodiment enables functions of the tag device which has a plurality of functions using the uni-directional protocol, for example, such as the handover function, the power reception function, and the like, to be exhibited.

Therefore, the information processing method according to the second embodiment enables the functions of the tag device (which corresponds to a device playing a role of a target in contactless communication) which are realized using contactless communication to be utilized more effectively.

[II] Example of Process Relating to Information Processing Method According to Second Embodiment Next, an example of a process relating to the above-described information processing method according to the second embodiment will be introduced.

A case in which a process relating to the information processing method according to the second embodiment is performed by the reader/writer device according to the second embodiment (an example of the information processing device according to the second embodiment) and contactless communication with the tag device (an example of an external device) is performed using NFC will be exemplified below.

In addition, a case in which the tag device has the handover function and the power reception function which enables power reception to be performed through NFC will be exemplified below. A case in which the tag device conveys its capability to the reader/writer device according to the second embodiment using Handover Select Record (an example of capability information) included in the NDEF message shown in FIG. 15 will be exemplified below.

Figure 19:
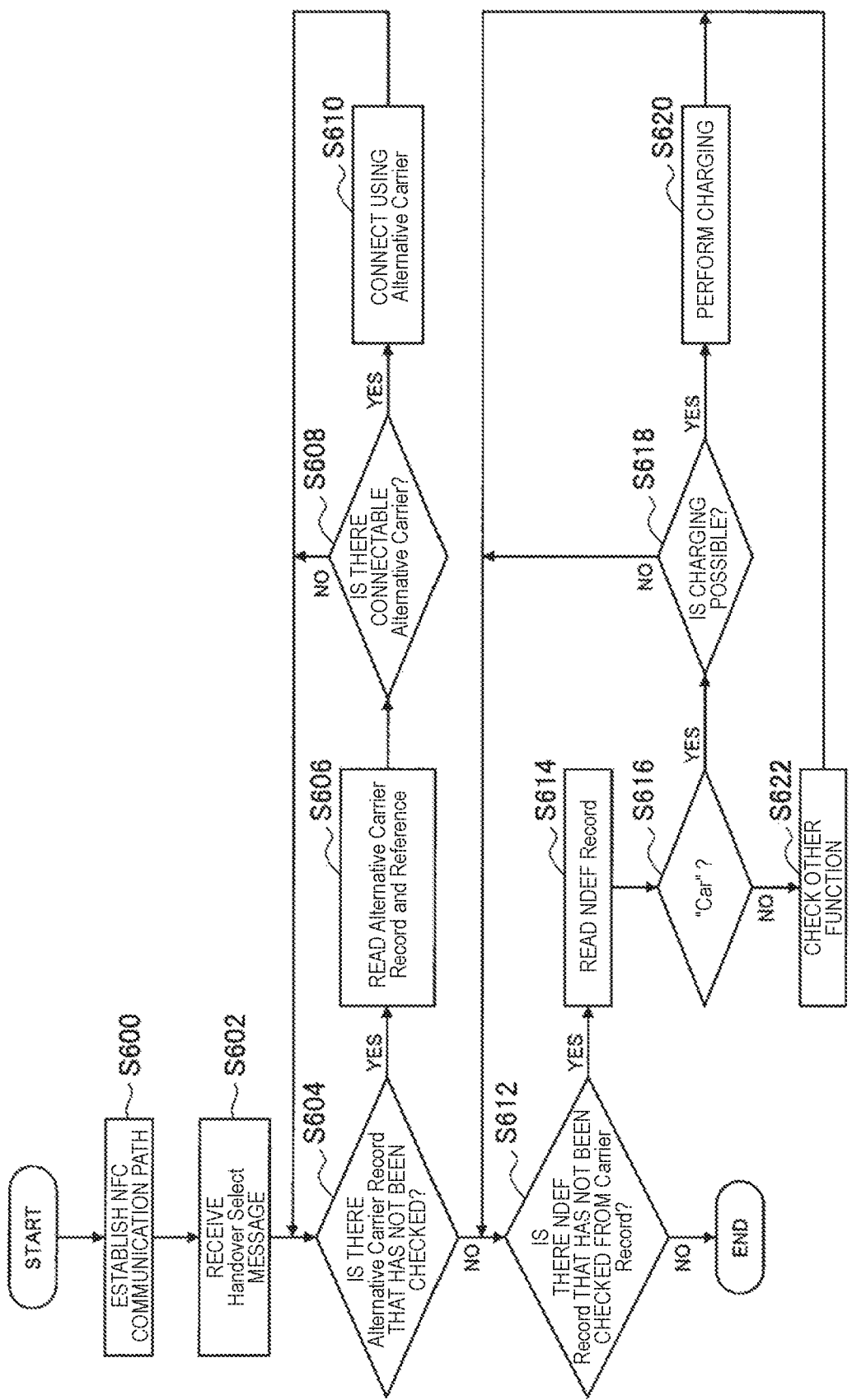
FIG. 19 is a flowchart showing an example of a process relating to an information processing method according to a second embodiment.

FIG. 19 is a flowchart showing an example of the process relating to the information processing method according to the second embodiment.

The reader/writer device according to the second embodiment establishes communication path for NFC between the tag device (S600). A communication path for NFC is established between the reader/writer device according to the second embodiment and the tag device similarly to Step S500 of FIG. 10.

The reader/writer device according to the second embodiment receives a Handover Select message transmitted from the tag device (S602). Here, since the tag device according to the second embodiment is a tag device which has a plurality of functions using the uni-directional protocol, the reader/writer device according to the second embodiment receives the Handover Select message using the uni-directional protocol.

The reader/writer device according to the second embodiment determines whether or not the received Handover Select message has ALTERNATIVE_CARRIER_RECORD that has not been checked (S604). Here, the process of Step S604 corresponds to the process of Static Handover defined by the NFC Forum.

In a case in which it is determined that there is ALTERNATIVE_CARRIER_RECORD that has not been checked in Step S604, the reader/writer device according to the second embodiment reads Carrier Record (which corresponds to connection information) that is referred to by Alternative Carrier Record and Reference (S606). Here, the process of Step S606 corresponds to the process of Static Handover defined by the NFC Forum.

The reader/writer device according to the second embodiment determines whether or not it is Carrier Record of a communication scheme supported by the reader/writer device according to the second embodiment (S608). Here, the process of Step S608 corresponds to the process of Static Handover defined by the NFC Forum.

In a case in which it is not determined that it is Carrier Record of a communication scheme supported by the reader/writer device according to the second embodiment in Step S608, the reader/writer device according to the second embodiment repeats the processes from Step S604.

In addition, in a case in which it is determined that it is Carrier Record of a communication scheme supported by the reader/writer device according to the second embodiment in Step S608, the reader/writer device according to the second embodiment starts communication using the supported communication scheme (S610). Here, the process of Step S610 corresponds to the process of Static Handover defined by the NFC Forum. Then, the reader/writer device according to the second embodiment repeats the processes from Step S604.

In a case in which it is not determined that there is ALTERNATIVE_CARRIER_RECORD that has not been checked in Step S604, the reader/writer device according to the second embodiment determines whether or not there is NDEF Record that has not been checked from Carrier Record (S612).

In a case in which it is not determined that there is NDEF Record that has not been checked in Step S612, the reader/writer device according to the second embodiment ends the process shown in FIG. 19.

In addition, in a case in which it is determined that there is NDEF Record that has not been checked in Step S612, the reader/writer device according to the second embodiment reads NDEF record and checks TYPE (S614).

The reader/writer device according to the second embodiment determines whether or TYPE is authentication response information (which may be referred to as "Car" below) of a charging protocol (S616).

In a case in which TYPE is determined to be authentication response information of the charging protocol in Step S616, the reader/writer device according to the second embodiment determines whether or not the reader/writer device according to the second embodiment can perform charging (S618).

In a case in which it is not determined that charging is possible in Step S618, the reader/writer device according to the second embodiment repeats the processes from Step S612.

In addition, in a case in which it is not determined that charging is possible in Step S618, the reader/writer device according to the second embodiment performs charging (S620). Then, the reader/writer device according to the second embodiment repeats the processes from Step S612.

In a case in which TYPE is not determined to be authentication response information of the charging protocol in Step S616, the reader/writer device according to the second embodiment performs a process relating to a function indicated by TYPE when the reader/writer device supports the function (S622). Then, the reader/writer device according to the second embodiment repeats the processes from Step S612.

The reader/writer device according to the second embodiment performs the process shown in FIG. 19, for example, as the process relating to the information processing method according to the second embodiment. By performing the process shown in FIG. 19, for example, the tag device can be caused to exhibit the Handover function and the power reception function in the case in which the tag device has the handover function and the power reception function.

Thus, the reader/writer device according to the second embodiment performs the process shown in FIG. 19, thereby enabling the functions of the tag device (an example of a device which plays a role of a target in contactless communication) which are realized using contactless communication to be utilized more effectively.

Note that an example of the process relating to the information processing method according to the second embodiment is not limited to the example shown in FIG. 19.

Figure 20:
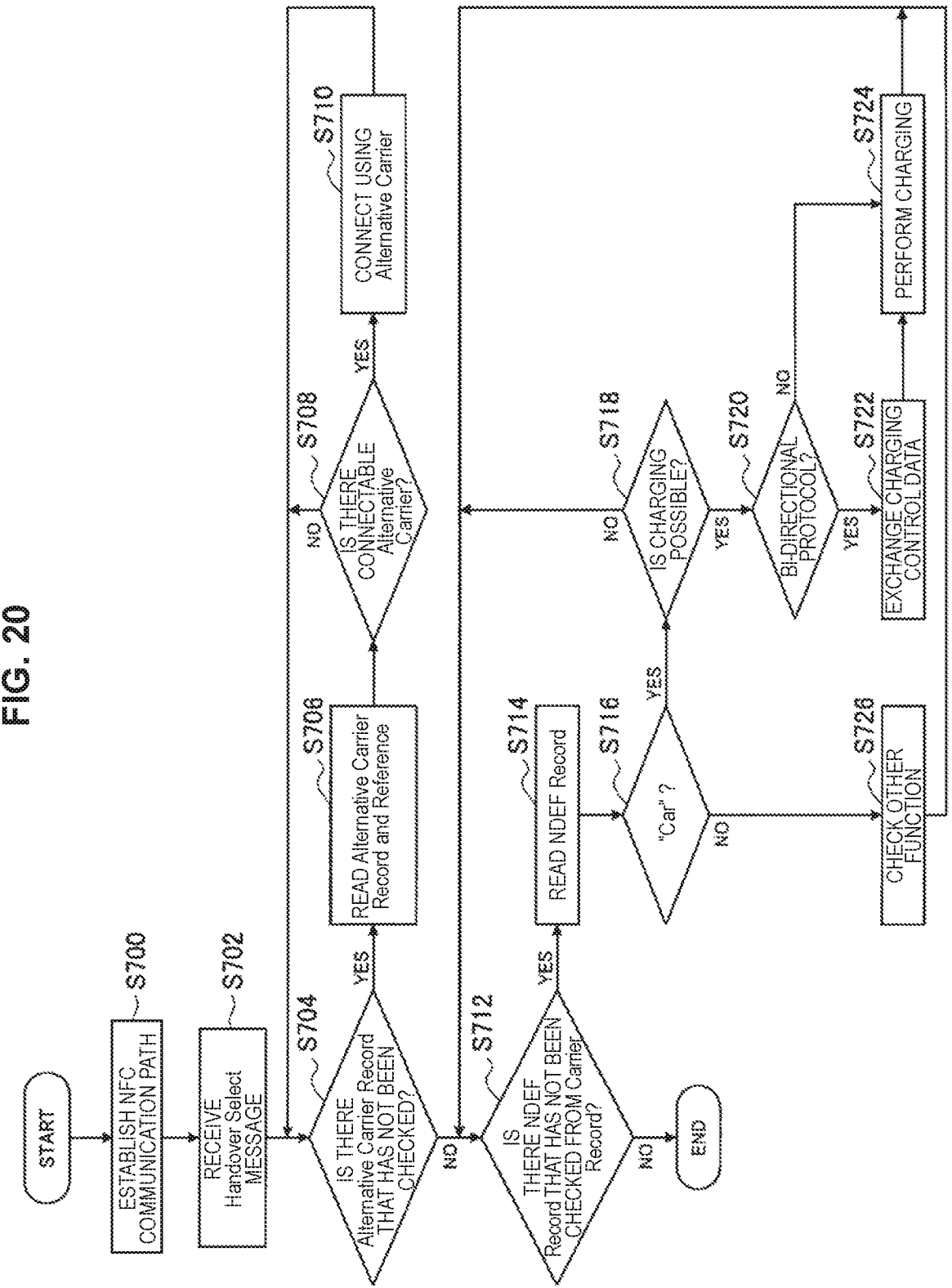
FIG. 20 is a flowchart showing another example of the process relating to the information processing method according to the second embodiment.

FIG. 20 is a flowchart showing another example of the process relating to the information processing method according to the second embodiment.

The reader/writer device according to the second embodiment establishes a communication path for NFC with the tag device similarly to Step S600 of FIG. 19 (S700).

The reader/writer device according to the second embodiment receives a Handover Select message transmitted from the tag device similarly to Step S602 of FIG. 19 (S702).

The reader/writer device according to the second embodiment determines whether or not the received Handover Select message has ALTERNATIVE_CARRIER_RECORD that has not been checked, similarly to Step S604 of FIG. 19 (S704).

In a case in which it is determined that there is ALTERNATIVE_CARRIER_RECORD that has not been checked in Step S704, the reader/writer device according to the second embodiment reads Carrier Record (which corresponds to connection information) that is referred to by Alternative Carrier Record and Reference similarly to Step S606 of FIG. 19 (S706).

The reader/writer device according to the second embodiment determines whether or not it is Carrier Record of a communication scheme supported by the reader/writer device according to the second embodiment, similarly to Step S608 of FIG. 19 (S708).

In a case in which it is not determined that it is Carrier Record of a communication scheme supported by the reader/writer device according to the second embodiment in Step S708, the reader/writer device according to the second embodiment repeats the processes from Step S704.

In addition, in a case in which it is determined that it is Carrier Record of a communication scheme supported by the reader/writer device according to the second embodiment in Step S708, the reader/writer device according to the second embodiment starts communication using the supported communication scheme, similarly to S610 of FIG. 19 (S710). Then, the reader/writer device according to the second embodiment repeats the processes from Step S704.

In a case in which it is not determined that there is ALTERNATIVE_CARRIER_RECORD that has not been checked in Step S704, the reader/writer device according to the second embodiment determines whether or not there is NDEF Record that has not been checked from Carrier Record, similarly to Step S712 of FIG. 20 (S712).

In a case in which it is not determined that there is NDEF Record that has not been checked in Step S612, the reader/writer device according to the second embodiment ends the process shown in FIG. 19.

In addition, in a case in which it is determined that there is NDEF Record that has not been checked in Step S712, the reader/writer device according to the second embodiment reads NDEF record and checks TYPE, similarly to Step S614 of FIG. 19 (S714).

The reader/writer device according to the second embodiment determines whether or not TYPE is authentication response information of a charging protocol, similarly to Step S616 of FIG. 19 (S716).

In a case in which TYPE is determined to be authentication response information of the charging protocol in Step S716, the reader/writer device according to the second embodiment determines whether or not the reader/writer device according to the second embodiment can perform charging, similarly to Step S618 of FIG. 19 (S718).

In a case in which it is not determined that charging is possible in Step S718, the reader/writer device according to the second embodiment repeats the processes from Step S712.

In addition, in a case in which it is determined that charging is possible in Step S718, the reader/writer device according to the second embodiment determines whether or not the protocol is the bi-directional protocol similarly to, for example, Step S106 of FIG. 1 (S720).

In a case in which the protocol is determined to be the bi-directional protocol in Step S720, the reader/writer device according to the second embodiment exchanges charging control data with the tag device through contactless communication (S722). As an example of a process of exchanging the charging control data in Step S722, for example, the processes of Steps S402 to S408 of FIG. 4 are exemplified.

In a case in which the protocol is not determined to be the bi-directional protocol in Step S720 (i.e., in a case in which the protocol is determined to be the uni-directional protocol) or the process of Step S722 has been performed, the reader/writer device according to the second embodiment performs charging (S724). Then, the reader/writer device according to the second embodiment repeats the processes from Step S712.

In a case in which TYPE is not determined to be authentication response information of the charging protocol in Step S716, the reader/writer device according to the second embodiment performs a process relating to a function indicated by TYPE when the reader/writer device supports the function, similarly to Step S622 of FIG. 19 (S726). Then, the reader/writer device according to the second embodiment repeats the processes from Step S712.

The reader/writer device according to the second embodiment can also perform the process shown in FIG. 20, for example, as the process relating to the information processing method according to the second embodiment. By performing the process shown in FIG. 20, for example, the tag device can be caused to exhibit the handover function and the power reception function in the case in which the tag device has the handover function and the power reception function.

Thus, the reader/writer device according to the second embodiment performs the process shown in FIG. 20, thereby enabling the functions of the tag device (an example of a device which plays a role of a target in contactless communication) which are realized using contactless communication to be utilized more effectively.

[III] Example of Configuration of Information Processing Device According to Second Embodiment Next, an example of a configuration of an information processing device according to the second embodiment which can perform the above-described process relating to the information processing method according to the second embodiment will be introduced. The information processing device according to the second embodiment corresponds to the above-described reader/writer device according to the second embodiment.

Figure 21:
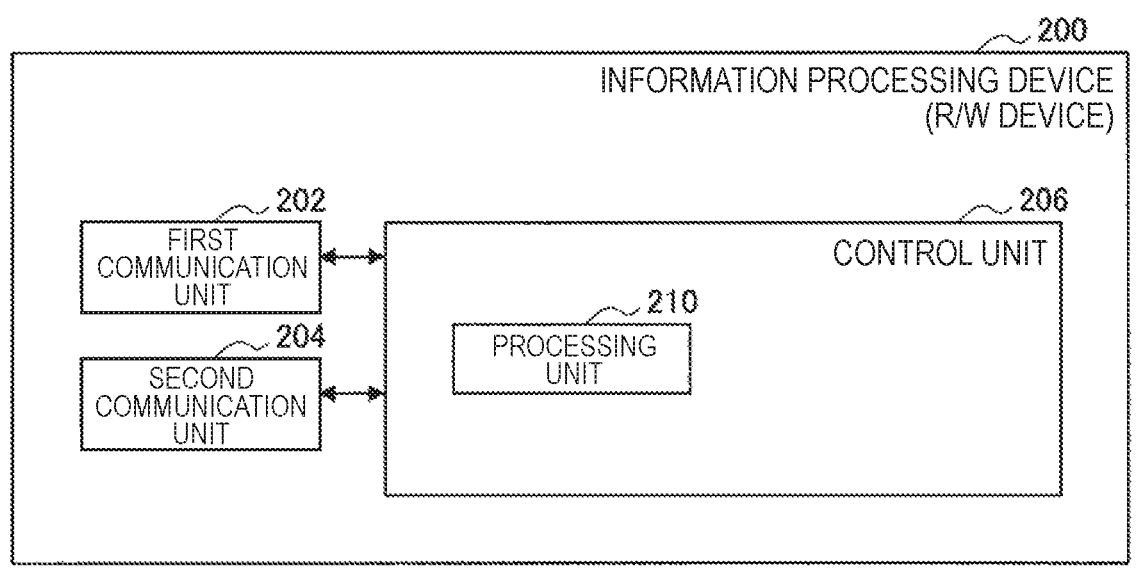
FIG. 21 is a block diagram illustrating an example of a configuration of an information processing device according to the second embodiment.

FIG. 21 is a block diagram illustrating an example of a configuration of the information processing device 200 according to the second embodiment. The information processing device 200 includes, for example, a first communication unit 202, a second communication unit 204, and a control unit 206.

In addition, the information processing device 200 may also include, for example, a ROM (which is not illustrated), a RAM (which is not illustrated), a storage unit (which is not illustrated), an operation unit (which is not illustrated) operable by a user, a display unit (which is not illustrated) that displays various screens on a display screen, and the like. The information processing device 200 has the above-described constituent elements connected to each other by, for example, a bus serving as a data transmission path. The information processing device 200 is driven by, for example, power supplied from an internal power source such as a battery included in the information processing device 200, power supplied from an external power source connected thereto, or the like.

The ROM (which is not illustrated) stores control data such as a program, arithmetic parameters, and the like to be used by the control unit 206. The RAM (which is not illustrated) temporarily stores a program and the like to be executed by the control unit 206.

The storage unit (which is not illustrated) is a storage means included in the information processing device 200, and stores, for example, data relating to the information processing method according to the second embodiment such as a table (or a database) in which types of processes and processing priorities are associated, and various kinds of data of applications, or the like. Here, as the storage unit (which is not illustrated), for example, a magnetic recording medium such as a hard disk, a non-volatile memory such as a flash memory, and the like are exemplified. In addition, the storage unit (which is not illustrated) may be detachable from the information processing device 200.

As the operation unit (which is not illustrated), an operation input device which will be described below is exemplified. In addition, as the display unit (which is not illustrated), a display device which will be described below is exemplified.

[Example of Hardware Configuration of Information Processing Device 200]

Figure 22:
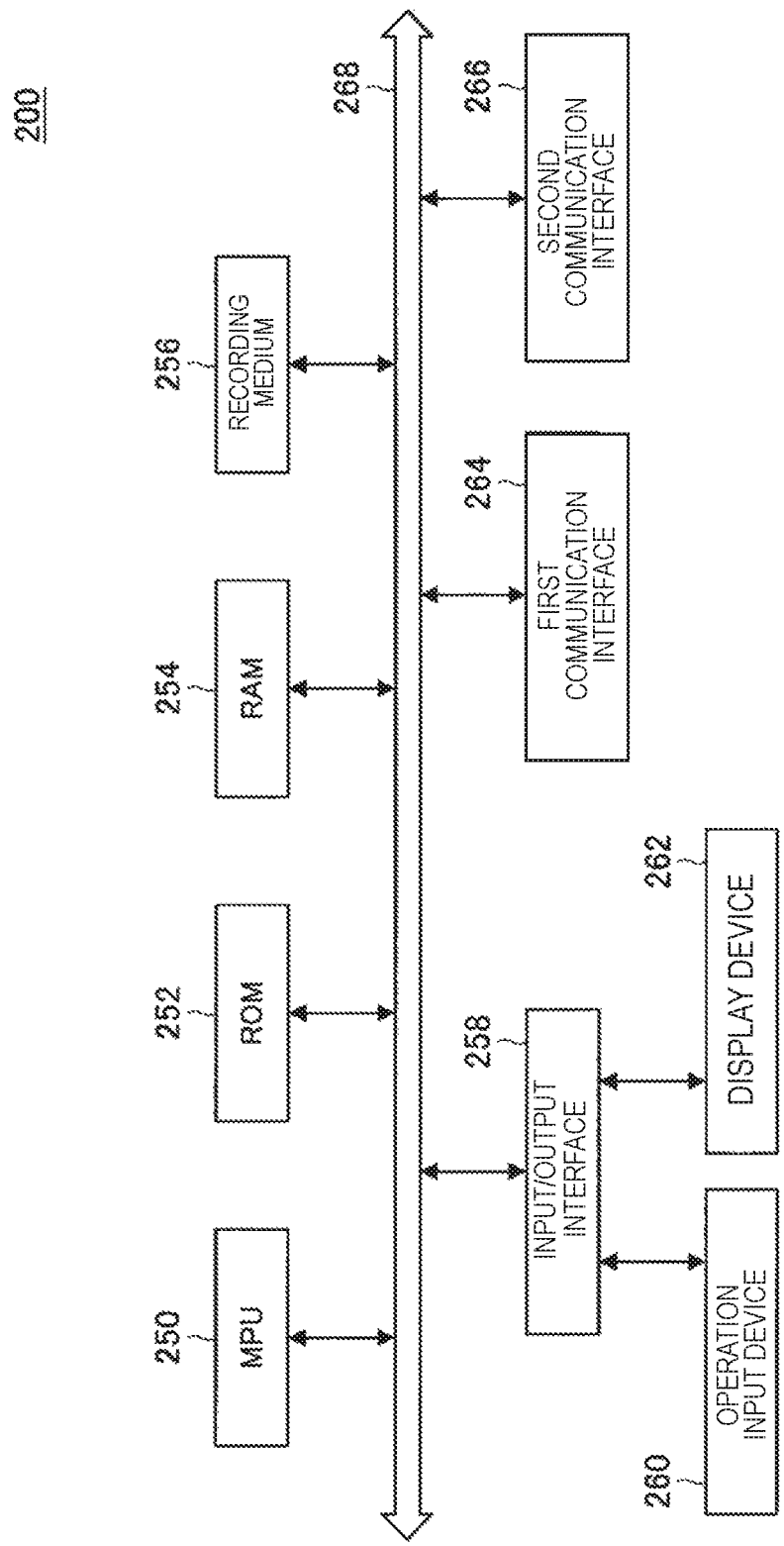
FIG. 22 is an explanatory diagram illustrating an example of a hardware configuration of the information processing device according to the second embodiment.

FIG. 22 is an explanatory diagram illustrating an example of a hardware configuration of the information processing device 200 according to the second embodiment. The information processing device 200 includes, for example, an MPU 250, a ROM 252, a RAM 254, a recording medium 256, an input/output interface 258, an operation input device 260, a display device 262, a first communication interface 264, and a second communication interface 266. In addition, the information processing device 200 has the constituent elements connected to each other by, for example, a bus 270 serving as a data transmission path.

The MPU 250 includes, for example, one or two or more processors, various processing circuits, and the like including arithmetic circuits such as MPUs, and functions as the control unit 206 which controls the entire information processing device 200. In addition, the MPU 250 plays a role of, for example, the processing unit 210, which will be described below, in the information processing device 200. Note that the processing unit 210 may include a dedicated (or a versatile) circuit (e.g., a separate processor from the MPU 250, or the like) which can execute processes of the processing unit 210.

The ROM 252 stores control data, and the like such as programs and arithmetic parameters to be used by the MPU 250. The RAM 254 temporarily stores, for example, a program to be executed by the MPU 250, and the like.

The recording medium 256 functions as the storage unit (which is not illustrated) and stores, for example, data relating to the information processing method according to the second embodiment such as a table (or a database) in which types of processes and processing priorities are associated, and various kinds of data of applications, or the like. Here, as the recording medium 256, for example, a magnetic recording medium such as a hard disk, a non-volatile memory such as a flash memory, and the like are exemplified. In addition, the recording medium 256 may be detachable from the information processing device 200.

The input/output interface 258 connects, for example, the operation input device 260 and the display device 262. The operation input device 160 functions as the operation unit (which is not illustrated), and the display device 262 functions as the display unit (which is not illustrated). Here, as the input/output interface 258, for example, a USB terminal, a DVI terminal, an HDMI (registered trademark) terminal, various processing circuits, and the like are exemplified. In addition, the operation input device 260 is provided, for example, on the information processing device 200 and is connected to the input/output interface 258 inside the information processing device 200. As the operation input device 260, for example, buttons, arrow keys, a rotation-type selector such as a jog dial, a combination thereof, or the like are exemplified. Furthermore, the display device 262 is provided, for example, on the information processing device 200 and is connected to the input/output interface 258 inside the information processing device 200. As the display device 262, for example, a liquid crystal display, an organic EL display, and the like are exemplified.

Note that it is needless to say that the input/output interface 258 can also be connected to an external device such as an external operation input device (e.g., a keyboard, a mouse, or the like) or an external display device of the information processing device 200. In addition, the display device 262 may be a device, for example, such as a touch panel capable of display and user operations.

The first communication interface 264 is one communication means included in the information processing device 200 and functions as the first communication unit 202. The first communication interface 264 plays a role of performing contactless communication with an external device such as a tag device.

Here, as the first communication interface 264, for example, an NFC communication device with a wireless communication antenna circuit and a carrier transmission circuit is exemplified.

A wireless communication antenna circuit which is included in the first communication interface 264 includes, for example, a resonance circuit including a coil having a predetermined inductance as a transmission/reception antenna and a capacitor having a predetermined electrostatic capacity and a demodulation circuit. In addition, the wireless communication antenna circuit demodulates data or the like transmitted from an external device by receiving a magnetic field (a carrier) of, for example, 13.56 [MHz].

In addition, a carrier transmission circuit which is included in the first communication interface 264 includes, for example, a modulation circuit which performs modulation such as Amplitude Shift Keying (ASK) and an amplification circuit which amplifies output of the modulation circuit, and transmits a carrier on which a carrier signal is placed from the transmission/reception antenna of the wireless communication antenna circuit. By including the carrier transmission circuit, for example, the information processing device 200 can have an initiator function in performing NFC. Here, the transmission of the carrier of the carrier transmission circuit is controlled by, for example, the MPU 250.

Note that the first communication interface 264 is not limited to the NFC communication device including the wireless communication antenna circuit and the carrier transmission circuit as described above. The first communication interface 264 may include, for example an IC chip which is driven by obtaining power from a received carrier and transmits a signal through load modulation. As a configuration of the IC chip, for example, the configuration shown in FIG. 14 is exemplified. By including the above-described IC chip, for example, the information processing device 200 can have a target function (a so-called card function) in performing NFC. Note that it is needless to say that hardware included in the information processing device 200 in the case in which the information processing device 200 has the target function in performing NFC is not limited to the form of the IC chip as described above.

The first communication interface 264 includes, for example, a NFC communication device including a wireless communication antenna circuit and a carrier transmission circuit as described above and an IC chip as described above.

Note that the first communication interface 264 is not limited to the above-described NFC communication device or the above-described IC chip. In a case in which contactless communication is communication of another communication scheme such as infrared communication, for example, the information processing device 200 includes a communication device supporting the other communication scheme such as an infrared communication interface including an infrared port, a transmission/reception circuit, and the like as the first communication interface 264.

The second communication interface 266 is another communication means included in the information processing device 200 and functions as the second communication unit 204.

The second communication interface 268 performs wireless or wired communication with an external device such as a tag device, for example, via a network (or directly).

Here, as the second communication interface 268, for example, a communication antenna and a RF circuit (for wireless communication), an IEEE 802.15.1 port and a transmission/reception circuit (for wireless communication), an IEEE 802.11 port and a transmission/reception circuit (for wireless communication), a LAN terminal and a transmission/reception circuit (for wired communication), or the like are exemplified. In addition, the second communication interface 268 can also have a configuration corresponding to a network, or a configuration corresponding to an arbitrary standard of a USB terminal and a transmission/reception circuit, or the like on which communication is possible. Furthermore, the second communication interface 268 may have a configuration in which communication can be performed with one or two or more external devices and the like using a plurality of communication schemes.

The information processing device 200 performs the process relating to the information processing method according to the second embodiment using, for example, the configuration illustrated in FIG. 22. Note that a hardware configuration of the information processing device 200 according to the present embodiment is not limited to the configuration illustrated in FIG. 22.

In a configuration in which contactless communication with an external device is performed via an external communication device with a function similar to that of the first communication interface 264, for example, the information processing device 200 according to the present embodiment may not include the first communication interface 264.

In addition, in a case in which the information processing device 200 according to the present embodiment does not have the handover function or performs communication with an external device via an external communication device with a communication function similar to that of the second communication interface 268, for example, the information processing device may not include the second communication interface 268.

In addition, the information processing device 200 can have a configuration in which, for example, one or two or more of the recording medium 256, the operation input device 260, and the display device 262 are not included.

Furthermore, a part of or the whole of the configuration illustrated in FIG. 22 (or a configuration according to a modified example) may be realized by, for example, one or two or more ICs.

In addition, the information processing device 100 can have a configuration in which, for example, one or two or more of the recording medium 156, the operation input device 160, and the display device 162 are not included.

Furthermore, a part of or the whole of the configuration illustrated in FIG. 22 (or a configuration according to a modified example) may be realized by, for example, one or two or more ICs.

The example of the configuration of the information processing device 200 will be described again with reference to FIG. 21. The first communication unit 202 is one communication means included in the information processing device 200 and performs contactless communication based on NFC or the like with an external device such as the tag device.

Here, as the first communication unit 202, for example, an NFC communication device including such a wireless communication antenna circuit and a carrier transmission circuit as described above is exemplified. Note that the first communication unit 102 may be a communication device relating to contactless communication other than NFC, such as a communication device relating to arbitrary optical communication such as infrared light.

The second communication unit 204 is another communication means included in the information processing device 200 and performs communication with an external device such as the tag device in a different communication scheme from that of the first communication unit 202. Communication of the second communication unit 204 is controlled by, for example, the control unit 206.

Here, as the second communication unit 204, for example, an IEEE 802.15.1 port and a transmission/reception circuit, and the like are exemplified. Note that a configuration of the second communication unit 204 is not limited to the above. The second communication unit 204 can have, for example, a configuration corresponding to an arbitrary standard of a USB terminal and a transmission/reception circuit, or the like on which communication is possible or an arbitrary configuration in which communication with an external device is possible via a network.

The control unit 206 includes, for example, an MPU or the like, and plays a role of controlling the information processing device 200 overall. In addition, the control unit 206 includes, for example, the processing unit 210, and plays a main role of performing the process relating to the information processing method according to the second embodiment.

The processing unit 210 plays a leading role of performing the process relating to the information processing method according to the second embodiment, and sequentially performs processes corresponding to two or more respective functions of an external device on the basis of capability information acquired from the external device through contactless communication. The processing unit 210 sequentially performs the processes corresponding to the two or more respective specified functions of the external device as described in, for example, (I) above to (IV) above.

As an example, in a case in which capability information includes a communication function (which corresponds to the above-described handover function) which performs communication based on another communication scheme different from the contactless communication, the processing unit 210 performs a process of starting communication based on the communication scheme which corresponds to the communication function. In addition, in a case in which the capability information includes a power reception function through contactless communication, the processing unit 210 performs a process of controlling charging through the contactless communication which corresponds to the power reception function.

Furthermore, in a case in which the capability information includes both the above-described communication function which performs communication based on the other communication scheme different from the contactless communication and the above-described power reception function through the contactless communication, the processing unit 210 performs the process of starting communication based on the communication scheme corresponding to the above-described communication function and then performs the process of controlling the charging. Note that it is needless to say that an example of the processes that the processing unit 210 sequentially performs is not limited to the above.

By including the processing unit 210, for example, the control unit 206 takes the lead at performing the process relating to the information processing method according to the second embodiment.

With the configuration shown in FIG. 21, for example, the information processing device 200 takes the lead at performing the process relating to the information processing method according to the second embodiment.

Here, the information processing device 200 sequentially performs the processes corresponding to the two or more respective functions of the external device specified on the basis of the capability information. Thus, the information processing device 200 can cause the external device which has a plurality of functions, for example, such as the handover function and the power reception function using the uni-directional protocol to exhibit the functions.

Thus, the information processing device 200 which performs the process relating to the information processing method according to the second embodiment enables the functions which are realized using contactless communication in the external device which plays a role of a target in contactless communication to be realized more effectively.

In addition, the information processing device 200 can exhibit an effect obtained by performing the above-described process relating to the information processing method according to the second embodiment.

Note that a configuration of the information processing device according to the second embodiment is not limited to the configuration illustrated in FIG. 21.

The information processing device according to the second embodiment can include, for example, the processing unit 210 illustrated in FIG. 21 separately from the control unit 206 (e.g., realized by another processing circuit).

Furthermore, in a case in which communication with an external device is performed via an external communication device with functions and a configuration similar to those of the first communication unit 202, the information processing device according to the second embodiment may not include the first communication unit 202.

In addition, in the case in which the information processing device according to the second embodiment does not have the handover function or performs communication with an external device via an external communication device with functions and a configuration similar to those of the second communication unit 204, the information processing device according to the first embodiment may not include the second communication unit 204.

The information processing device 200 according to the second embodiment can be applied to various devices which can perform the process relating to the information processing method according to the second embodiment, for example, such as a reader/writer device, a communication device such as a mobile telephone or a smartphone, a tablet-type device, or a computer such as a PC. In addition, the present embodiment can also be applied to a processing IC, for example, which can be incorporated into the devices as described above.

Information Processing Method and Information Processing Device According to Third Embodiment Next, as an information processing method according to the third embodiment, an "information processing method for causing charging to be stopped when charging a device playing a role of a target is performed in contactless communication" will be described. Here, as the device playing a role of a target in a case in which the information processing method according to the third embodiment is applied, a device supporting the uni-directional protocol or a device supporting the bi-directional protocol is exemplified.

A case in which a process relating to the information processing method according to the third embodiment is performed by an information processing device according to the third embodiment will be exemplified below. The information processing device according to the third embodiment corresponds to a reader/writer device among devices which perform contactless communication according to the present embodiment. Thus, the information processing device according to the third embodiment may be referred to as a "reader/writer device according to the third embodiment" below for the sake of convenience in description. In addition, a case in which a device which plays a role of a target in contactless communication is a tag device will be exemplified below.

The information processing method according to the third embodiment is applied to, for example, stop of charging through contactless communication performed using the above-described information processing method according to the first embodiment or stop of charging through contactless communication performed using the above-described information processing method according to the second embodiment.

Note that an application example of the information processing method according to the third embodiment is not limited to the above. Stop of charging using the information processing method according to the third embodiment can be applied to, for example, stop of charging through arbitrary contactless communication performed without using the above-described information processing method according to the first embodiment or the above-described information processing method according to the second embodiment.

A case in which the information processing method according to the third embodiment is applied to stop of charging through contactless communication performed using the above-described information processing method according to the second embodiment will be exemplified below.

[i] Overview of Information Processing Method According to Third Embodiment

In a case in which a change of load impedance of an external device such as a tag device serving as a charging target is detected when charging through contactless communication is being performed, for example, the reader/writer device according to the third embodiment causes the charging through contactless communication to be stopped.

Here, load impedance of an external device serving as a charging target is changed by, for example, controlling a load relating to load modulation in the external device as described with regard to the tag device according to the first embodiment.

In addition, the reader/writer device according to the third embodiment detects a change of the load impedance of the external device by, for example, demodulating a signal received by a transmission/reception antenna which is included in a wireless communication antenna circuit which is included in a first communication interface 264 in a demodulation circuit of the wireless communication antenna circuit. The above-described demodulation circuit demodulates the signal received by the above-described transmission/reception antenna by, for example, performing envelope detection for an amplitude change of a voltage between a modulation circuit (or an amplification circuit) included in the wireless communication antenna circuit and a resonance circuit of the above-described transmission/reception antenna and binarizing the detected signal. Note that the above-described demodulation circuit can also demodulate the signal received by the above-described transmission/reception antenna using, for example, a phase change of a voltage between the above-described modulation circuit (or the amplification circuit) and the resonance circuit of the above-described transmission/reception antenna.

In a case in which load impedance of the external device serving as a charging target changes from a low state to a high state and the high state continues for a predetermined period of time or longer, for example, the reader/writer device according to the third embodiment determines that a change of load impedance has been detected.

By the reader/writer device according to the third embodiment causing charging through contactless communication to be stopped in the case in which the change of load impedance of the external device serving as a charging target has been detected, the effects as described below, for example, are exhibited.

Since stop of charging can be determined without receiving a signal indicating an end of power reception through less communication such as contactless communication, the stop of the charging can be determined in a shorter period of time.

Since stop of charging can be determined without receiving a signal indicating an end of power reception through communication such as contactless communication, a reduction in power resulting from the stop of the charging can be expected (by an amount of extra signals that are not transmitted or received).

Note that a process relating to stop of charging through contactless communication by the reader/writer device according to the third embodiment is not limited to the above-described example.

For example, in a case in which a predetermined period of time has elapsed from a start of charging through contactless communication, the reader/writer device according to the third embodiment may cause the charging through the contactless communication to be stopped (which is so-called stop of charging due to a timeout). Here, the above-described predetermined period of time may be a pre-set fixed time (period) or a variable time (period) that can be changed on the basis of a user operation of the reader/writer device according to the third embodiment or the like.

[ii] Example of Process Relating to Information Processing Method According to Third Embodiment Next, an example of a process relating to the above-described information processing method according to the third embodiment will be introduced.

A case in which a process relating to the information processing method according to the third embodiment is performed by the reader/writer device according to the third embodiment (an example of the information processing device according to the second embodiment) and contactless communication with the tag device (an example of an external device) is performed using NFC will be exemplified below.

Figure 23:
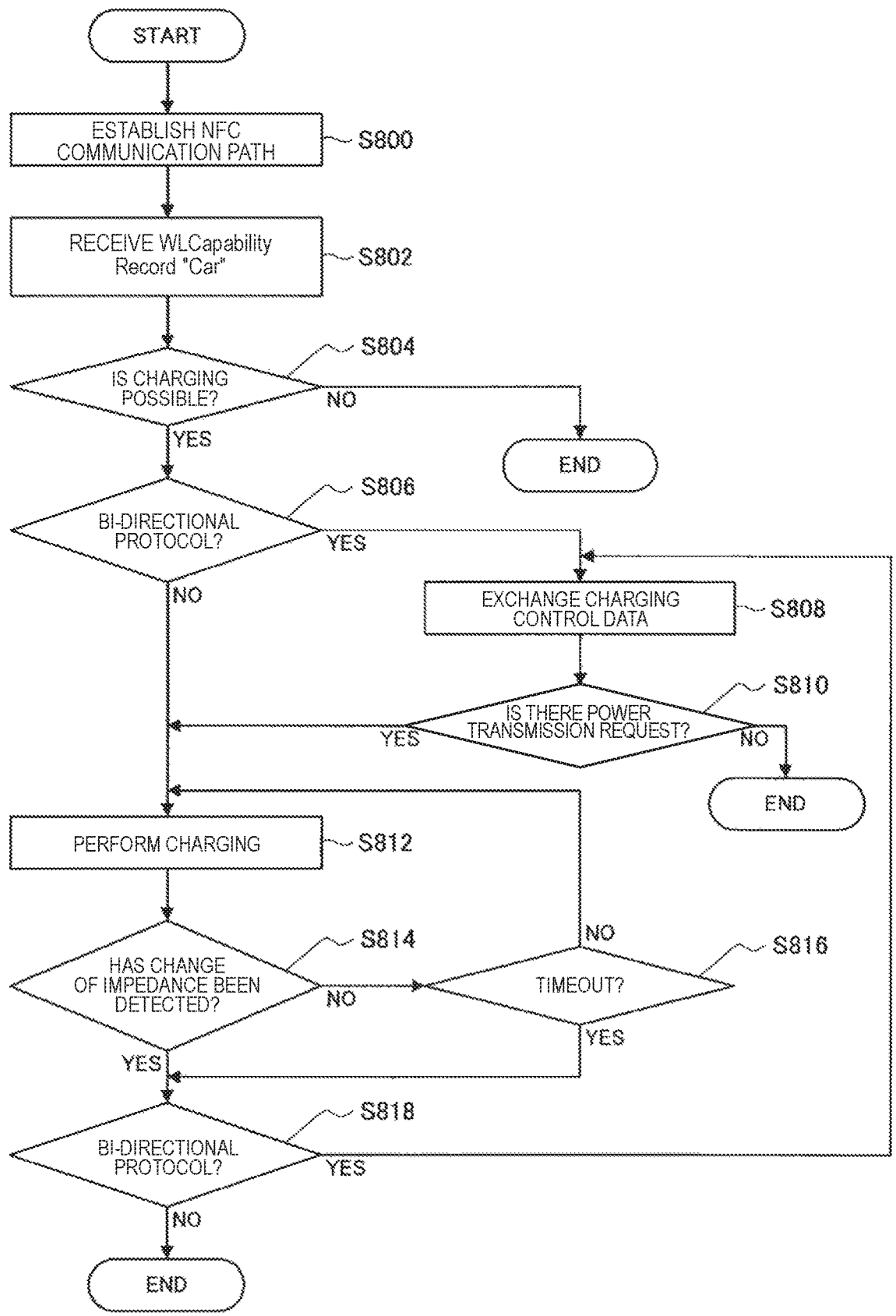
FIG. 23 is a flowchart showing an example of a process relating to an information processing method according to a third embodiment.

FIG. 23 is a flowchart showing an example of the process relating to the information processing method according to the third embodiment.

The reader/writer device according to the third embodiment establishes a communication path for NFC with a tag device, similarly to Step S600 of FIG. 19 (S800). Note that, in a case in which a communication path for NFC has already been established, the process of Step S800 may not be performed.

The reader/writer device according to the third embodiment receives "Car" (authentication response information of a charging protocol) of WLCapability Record from the tag device (S802). The reader/writer device according to the third embodiment receives "Car" by receiving a Handover Select message transmitted from the tag device.

The reader/writer device according to the third embodiment determines whether or not charging is possible, for example, similarly to Step S618 of FIG. 19 (S804).

In a case in which it is not determined that charging is possible in Step S804, the reader/writer device according to the third embodiment ends the process of FIG. 23 without performing charging.

In addition, in a case in which it is determined that charging is possible in Step S804, the reader/writer device according to the third embodiment determines whether or not the protocol is the bi-directional protocol similarly to, for example, Step S106 of FIG. 1 (S806).

In a case in which the protocol is not determined to be the bi-directional protocol in Step S806, the reader/writer device according to the third embodiment performs a process of Step S812 which will be described below.

In addition, in a case in which the protocol is determined to be the bi-directional protocol in Step S806, the reader/writer device according to the third embodiment exchanges charging control data with the tag device using the contactless communication, for example, similarly to Step S722 of FIG. 21 (S808).

The reader/writer device according to the third embodiment determines whether or not a power transmission request has been received from the tag device on the basis of the charging control data acquired from the tag device (S810).

In a case in which it is not determined that a power transmission request has been acquired in Step S810, the reader/writer device according to the third embodiment ends the process of FIG. 23 without performing charging.

In addition, in a case in which it is determined that a power transmission request has been acquired in Step S810 or the protocol is not determined to be the bi-directional protocol in Step S806, the reader/writer device according to the third embodiment performs charging (S812).

When charging is started, the reader/writer device according to the third embodiment determines whether or not a change of load impedance of the tag device (an example of an external device serving as a charging target) has been detected (S814).

In a case in which a change of load impedance of the tag device is not determined to have been detected in Step S814, the reader/writer device according to the third embodiment determines whether or not a timeout of the charging time has occurred (S816). In a case in which a predetermined period of time has elapsed from the start of the charging through contactless communication in Step S812, for example, the reader/writer device according to the third embodiment determines that a timeout of the charging time has occurred.

In a case in which it is not determined that a timeout of the charging time has occurred in Step S816, the reader/writer device according to the third embodiment repeats the processes from Step S812.

In addition, in a case in which it is determined that a timeout of the charging time has occurred in Step S816, the process of Step S818, which will be described below, is performed.

In the case in which it is determined that a change of load impedance of the tag device has been detected in Step S814 or a timeout of the charging time has occurred in Step S816, the reader/writer device according to the third embodiment determines whether or not a protocol is the bi-directional protocol (S818). The reader/writer device according to the third embodiment determines whether or not it is the bi-directional protocol on the basis of, for example, a determination result of Step S806. Note that the reader/writer device according to the third embodiment may determine whether or not it is the bi-directional protocol by performing, for example, a process similar to Step S106 of FIG. 1 again.

In a case in which the protocol is determined to be the bi-directional protocol in Step S818, the reader/writer device according to the third embodiment repeats the processes from Step S808.

In addition, in a case in which the protocol is not determined to be the bi-directional protocol in Step S818, the reader/writer device according to the third embodiment ends the process of FIG. 23.

The reader/writer device according to the third embodiment performs, for example, the process shown in FIG. 23 as the process relating to the information processing method according to the third embodiment. By performing the process shown in FIG. 23, the reader/writer device according to the third embodiment can cause the charging through contactless communication to be stopped.

Furthermore, by causing charging through contactless communication to be stopped in the case in which a change of load impedance of an external device serving as a charging target has been detected like the process shown in FIG. 23, the reader/writer device according to the third embodiment can exhibit effects obtained by performing the above-described "stop of charging based on a change of load impedance according to the information processing method according to the third embodiment."

Note that the process relating to the information processing method according to the third embodiment is not limited to the example shown in FIG. 23.

Although the example in which charging through contactless communication is stopped in the case in which it is determined that a change of load impedance of the tag device has been detected in Step S814 or a timeout of the charging time has occurred in Step S816 is shown in FIG. 23, for example, the reader/writer device according to the third embodiment can also cause the charging through contactless communication to be stopped by performing one of the process of Step S814 and the process of Step S816.

In addition, as described above, the stop of charging according to the information processing method according to the third embodiment can be applied to stop of charging through arbitrary contactless communication performed without using, for example, the information processing method according to the first embodiment or the information processing method according to the second embodiment described above.

[iii] Example of Configuration of Information Processing Device according to Third Embodiment Next, an example of a configuration of the information processing device according to the third embodiment which can perform the process relating to the above-described information processing method according to the third embodiment will be introduced.

The information processing device according to the third embodiment has a configuration (also including a modified example) similar to, for example, that of the information processing device 200 according to the second embodiment shown in FIG. 21. In addition, the information processing device according to the third embodiment has a hardware configuration (also including a modified example) similar to, for example, that of the information processing device according to the second embodiment 200 shown in FIG. 22.

The processing unit 210 of the information processing device according to the third embodiment, for example, takes the lead at performing the process relating to the information processing method according to the third embodiment.

In a case in which a change of load impedance of an external device is detected when charging through contactless communication is being performed, for example, the processing unit 210 according to the third embodiment causes the charging through contactless communication to be stopped. In addition, in a case in which a predetermined period of time has elapsed from the start of charging through contactless communication, for example, the processing unit 210 according to the third embodiment may cause the charging through the contactless communication to be stopped.

The information processing device according to the third embodiment can be applied to various devices which can perform the process relating to the information processing method according to the third embodiment, for example, such as a reader/writer device, a communication device such as a mobile telephone or a smartphone, a tablet-type device, or a computer such as a PC. In addition, the present embodiment can also be applied to a processing IC, for example, which can be incorporated into the devices as described above.

Program According to Present Embodiment

[A] Program for Causing Computer to Function as Information Processing Device According to First Embodiment By a processor or the like executing a program (e.g., a program capable of executing the process relating to the information processing method performed by the tag device or the information processing device 100 according to the first embodiment) for causing a computer to function as the information processing device according to the first embodiment in the computer, functions of the information processing device according to the first embodiment (which corresponds to a device that plays a role of a target in contactless communication) which are realized using contactless communication are enabled to be utilized more effectively.

In addition, by a processor or the like executing the program for causing a computer to function as the information processing device according to the first embodiment using in the computer, the effects obtained by performing the process relating to the information processing method performed by the above-described information processing device 100 can be exhibited.

[B] Program for Causing Computer to Function as Information Processing Device According to Second Embodiment By a processor or the like executing a program (e.g., a program capable of executing the process relating to the information processing method performed by the reader/writer device or the information processing device 200 according to the second embodiment) for causing a computer to function as the information processing device according to the second embodiment in the computer, functions of a device such as a tag device that plays a role of a target in contactless communication which are realized using contactless communication are enabled to be utilized more effectively.

In addition, by a processor or the like executing the program for causing a computer to function as the information processing device according to the second embodiment using in the computer, the effects obtained by performing the process relating to the information processing method performed by the above-described information processing device 200 can be exhibited.

[C] Program for Causing Computer to Function as Information Processing Device According to Third Embodiment By a processor or the like executing a program (e.g., a program capable of executing the process relating to the information processing method performed by the reader/writer device according to the third embodiment) for causing a computer to function as the information processing device according to the third embodiment in the computer, charging through contactless communication can be caused to be stopped.

Furthermore, by a processor or the like executing the program for causing a computer to function as the information processing device according to the third embodiment in the computer, the effects obtained by performing the above-described "stop of charging based on a change of load impedance according to the information processing method according to the third embodiment" can be exhibited.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the provision of the program (a computer program) for causing a computer to function as the information processing device according to the first embodiment has been introduced above, for example, a recording medium having the above-described program stored therein can also be provide together in the present embodiment.

In addition, although the provision of the program (a computer program) for causing a computer to function as the information processing device according to the second embodiment has been introduced above, a recording medium having the above-described program stored therein can also be provide together in the present embodiment.

In addition, although the provision of the program (a computer program) for causing a computer to function as the information processing device according to the third embodiment has been introduced above, a recording medium having the above-described program stored therein can also be provide together in the present embodiment.

The above-described configuration shows an example of the present embodiment and of course belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1)

An information processing device including:

a processing unit configured to select a first processing mode in which static information is transmitted or a second processing mode in which dynamic information according to a process is transmitted on a basis of a predetermined request recognized in contactless communication with an external device and to perform a process corresponding to a selected processing mode, in which the processing unit selects the first processing mode in a case in which the recognized predetermined request is a read request for causing information to be transmitted and selects the second processing mode in a case in which the recognized predetermined request is a write request for causing information to be written in a recording medium.

(2)

The information processing device according to (1), in which, in a case in which the predetermined request is recognized when a flag indicating that one processing mode has been selected is not set, the processing unit determines the recognized predetermined request to be the predetermined request that is recognized first.

(3)

The information processing device according to (2), in which, in a case in which the second processing mode has been selected, the processing unit sets the flag.

(4)

The information processing device according to (3), in which, in a case in which a process according to the read request is performed when the flag is set, the processing unit cancels the flag.

(5)

The information processing device according to any one of (1) to (4), in which, in a case in which the first processing mode has been selected, the processing unit transmits connection information for performing communication based on another communication scheme different from the contactless communication with the external device as the static information.

(6)

The information processing device according to any one of (1) to (5), in which, in a case in which the second processing mode has been selected, the processing unit transmits information relating to power reception as the dynamic information.

(7)

The information processing device according to (6), in which, in a case in which an end of power reception is detected when charging from the external device is being performed through the contactless communication on a basis of the information relating to power reception, the processing unit changes impedance.

(8)

The information processing device according to (7), in which the contactless communication with the external device is performed using load modulation, and the processing unit changes the impedance by switching a load relating to the load modulation from an off-state to an on-state and maintaining the on-state.

(9)

An information processing device including:

a processing unit configured to sequentially perform processes corresponding to two or more respective functions of an external device on a basis of capability information indicating the functions acquired from the external device through contactless communication.

(10)

The information processing device according to (9), in which the processing unit sequentially performs the processes corresponding to the respective functions in prescribed order.

(11)

The information processing device according to (9), in which the processing unit sequentially performs the processes corresponding to the respective functions in order defined in the capability information.

(12)

The information processing device according to (9), in which the processing unit sets order of processes on the basis of the capability information and sequentially performs the processes corresponding to the respective functions in the set order.

(13)

The information processing device according to any one of (9) to (12), in which, in a case in which the capability information includes a power reception function that uses the contactless communication, the processing unit performs a process of controlling charging through the contactless communication corresponding to the power reception function.

(14)

The information processing device according to (13), in which, in a case in which the capability information further includes a communication function which performs communication based on another communication scheme different from the contactless communication, the processing unit performs the process of controlling the charging after performing a process of starting communication based on a communication scheme corresponding to the communication function is performed.

(15)

The information processing device according to (13) or (14), in which, in a case in which a change of load impedance of the external device is detected when charging through the contactless communication is being performed, the processing unit causes the charging through the contactless communication to be stopped.

(16)

The information processing device according to any one of (13) to (15), in which, in a case in which a predetermined period of time has elapsed from a start of the charging through the contactless communication, the processing unit causes the charging through the contactless communication to be stopped.

(17)

An information processing method that is executed by an information processing device, the information processing method including:

a step of selecting a first processing mode in which static information is transmitted or a second processing mode in which dynamic information according to a process is transmitted on a basis of a predetermined request recognized in contactless communication with an external device and performing a process corresponding to a selected processing mode, in which, in the step of performing the process, the first processing mode is selected in a case in which the recognized predetermined request is a read request for causing information to be transmitted and the second processing mode is selected in a case in which the recognized predetermined request is a write request for causing information to be written in a recording medium.

(18)

An information processing method that is executed by an information processing device, the information processing method including:

a step of sequentially performing processes corresponding to two or more respective functions of an external device on a basis of capability information indicating the functions acquired from the external device through contactless communication.

(19)

A program causing a computer to realize a function of selecting a first processing mode in which static information is transmitted or a second processing mode in which dynamic information according to a process is transmitted on a basis of a predetermined request recognized in contactless communication with an external device and performing a process corresponding to a selected processing mode, in which the function of performing the process selects the first processing mode in a case in which the recognized predetermined request is a read request for causing information to be transmitted and selects the second processing mode in a case in which the recognized predetermined request is a write request for causing information to be written in a recording medium.

(20)

A program for causing a computer to realize a function of sequentially performing processes corresponding to two or more respective functions of an external device on a basis of capability information indicating the functions acquired from the external device through contactless communication.

REFERENCE SIGNS LIST 100, 200 information processing device
102, 202 first communication unit
104, 204 second communication unit
106, 206 control unit
110, 210 processing unit

The invention claimed is:

1. An information processing device comprising:
a processing unit configured to select a first processing mode in which static information regarding connection information that indicates a communication scheme for connection handover is transmitted or a second processing mode in which dynamic information regarding power reception information for charging control is transmitted, on a basis of a predetermined request recognized in contactless communication with an external device, and to perform a process using a uni-directional protocol when the first processing mode is selected, and to perform a process using a bi-directional protocol when the second processing mode is selected,
wherein the processing unit selects the first processing mode in a case in which the recognized predetermined request is a read request for causing information to be transmitted, and selects the second processing mode in a case in which the recognized predetermined request is a write request for causing information to be written in a recording medium,
wherein the static information regarding connection information does not change due to performing the connection handover, the connection handover being performed based on the static information regarding connection information,
wherein the dynamic information regarding power reception information changes due to performing the charging control, the charging control being performed based on the dynamic information regarding power reception information, and
wherein the processing unit is implemented via at least one processor.

2. The information processing device according to claim 1, wherein, in a case in which the predetermined request is recognized when a flag indicating that one processing mode has been selected is not set, the processing unit determines the recognized predetermined request to be the predetermined request that is recognized first.

3. The information processing device according to claim 2, wherein, in a case in which the second processing mode has been selected, the processing unit sets the flag.

4. The information processing device according to claim 3, wherein, in a case in which a process according to the read request is performed when the flag is set, the processing unit cancels the flag.

5. The information processing device according to claim 1, wherein, in a case in which the first processing mode has been selected, the processing unit transmits connection information for performing communication based on another communication scheme different from the contactless communication with the external device as the static information.

6. The information processing device according to claim 1, wherein, in a case in which an end of power reception is detected when charging from the external device is being performed through the contactless communication on a basis of the information relating to power reception, the processing unit changes impedance.

7. The information processing device according to claim 6,
wherein the contactless communication with the external device is performed using load modulation, and
the processing unit changes the impedance by switching a load relating to the load modulation from an off-state to an on-state and maintaining the on-state.

8. An information processing method that is executed by an information processing device, the information processing method comprising:
selecting a first processing mode in which static information regarding connection information that indicates a communication scheme for connection handover is transmitted or a second processing mode in which dynamic information regarding power reception information for charging control is transmitted, on a basis of a predetermined request recognized in contactless communication with an external device;
performing a process using a uni-directional protocol when the first processing mode is selected; and
performing a process using a bi-directional protocol when the second processing mode is selected,
wherein, in performing the process, the first processing mode is selected in a case in which the recognized predetermined request is a read request for causing information to be transmitted, and the second processing mode is selected in a case in which the recognized predetermined request is a write request for causing information to be written in a recording medium,
wherein the static information regarding connection information does not change due to performing the connection handover, the connection handover being performed based on the static information regarding connection information, and
wherein the dynamic information regarding power reception information changes due to performing the charging control, the charging control being performed based on the dynamic information regarding power reception information.

9. A non-transitory computer-readable medium having embodied thereon a program, which when executed by at least one processor of an information processing device causes the information processing device to execute a method, the method comprising:
selecting a first processing mode in which static information regarding connection information that indicates a communication scheme for connection handover is transmitted or a second processing mode in which dynamic information regarding power reception information for charging control is transmitted, on a basis of a predetermined request recognized in contactless communication with an external device;
performing a process using a uni-directional protocol when the first processing mode is selected; and
performing a process using a bi-directional protocol when the second processing mode is selected,
wherein the performed process includes selecting the first processing mode in a case in which the recognized predetermined request is a read request for causing information to be transmitted, and includes selecting the second processing mode in a case in which the recognized predetermined request is a write request for causing information to be written in a recording medium, wherein the static information regarding connection information does not change due to performing the connection handover, the connection handover being performed based on the static information regarding connection information, and wherein the dynamic information regarding power reception information changes due to performing the charging control, the charging control being performed based on the dynamic information regarding power reception information.

\* \* \* \* \*